(12) United States Patent
Fujii

(10) Patent No.: US 10,647,354 B2
(45) Date of Patent: May 12, 2020

(54) STEERING ASSIST DEVICE

(71) Applicant: TOYOTA JIDOSHA KABUSHIKI KAISHA, Toyota-shi, Aichi-ken (JP)

(72) Inventor: Shota Fujii, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 183 days.

(21) Appl. No.: 15/996,817

(22) Filed: Jun. 4, 2018

(65) Prior Publication Data

US 2018/0346027 A1 Dec. 6, 2018

(30) Foreign Application Priority Data

Jun. 6, 2017 (JP) .................... 2017-111681

(51) Int. Cl.
*B62D 15/02* (2006.01)
*B60Q 9/00* (2006.01)
*B60W 30/09* (2012.01)

(52) U.S. Cl.
CPC ............ *B62D 15/025* (2013.01); *B60Q 9/00* (2013.01); *B60W 30/09* (2013.01); *B62D 15/0255* (2013.01); *B60W 2550/30* (2013.01); *B60W 2710/20* (2013.01)

(58) Field of Classification Search
CPC .... B62D 15/025; B62D 15/0255; B60Q 9/00; B60W 30/09; B60W 2550/30; B60W 2710/20
See application file for complete search history.

(56) References Cited

U.S. PATENT DOCUMENTS

| 7,391,304 | B2 | 6/2008 | Kataoka et al. | |
| 9,076,338 | B2* | 7/2015 | Taguchi | G08G 1/161 |
| 2005/0270145 | A1 | 12/2005 | Kataoka et al. | |
| 2006/0025918 | A1 | 2/2006 | Saeki | |
| 2016/0107687 | A1* | 4/2016 | Yamaoka | B62D 15/0255 701/41 |
| 2017/0101094 | A1* | 4/2017 | Fiaschetti | B60W 30/12 |
| 2017/0341652 | A1 | 11/2017 | Sugawara et al. | |
| 2018/0178790 | A1* | 6/2018 | Oguri | G08G 1/167 |
| 2019/0291732 | A1* | 9/2019 | Fiaschetti | B62D 15/025 |

FOREIGN PATENT DOCUMENTS

| JP | 2008-195402 A | 8/2008 |
| JP | 4172434 B2 | 10/2008 |
| JP | 2006-315491 A | 11/2008 |

(Continued)

*Primary Examiner* — Calvin Cheung
(74) *Attorney, Agent, or Firm* — Sughrue Mion, PLLC

(57) ABSTRACT

A steering control device includes a driving support ECU. The driving support ECU 10 is configured to execute an original lane return assist control to control a steering so as to return an own vehicle from a target lane to the original lane when a lane change assist control is stopped by detection of a first approaching vehicle in a situation where the own vehicle enters the target lane to travel in the target lane. The driving support ECU is configured to prohibit the original lane return assist control and to execute a lateral speed zero control to control the steering so as to maintain a lateral speed which is a speed in a lane width direction of the own vehicle at zero, when an original lane side vehicle is being detected.

4 Claims, 19 Drawing Sheets

(56) References Cited

FOREIGN PATENT DOCUMENTS

| | | | |
|---|---|---|---|
| JP | 2009-190464 | A | 8/2009 |
| JP | 4349210 | B2 | 10/2009 |
| JP | 2010-006279 | A | 1/2010 |
| JP | 4929777 | B2 | 5/2012 |
| JP | 2014-148293 | A | 8/2014 |
| JP | 2016-126360 | A | 7/2016 |

* cited by examiner

STEERING ASSIST DEVICE

BACKGROUND OF THE INVENTION

1. Field of the Invention

The present invention relates to a steering assist device configured to assist a steering operation for changing lanes.

2. Description of the Related Art

Hitherto, there has been known a steering assist device configured to perform control (called a "lane change assist control") to assist a steering operation so that an own vehicle changes lanes from the lane (referred to as an "original lane") in which the own vehicle is currently traveling to a lane adjacent to the original lane (referred to as an "adjacent lane" or a "target lane").

For example, a vehicle control system proposed in Japanese Patent Application Laid-open No. 2016-126360 is configured to monitor the surroundings of the own vehicle and determine whether or not an other vehicle is present which is a hindrance/obstacle in executing the lane change assist control. The vehicle control system is configured not to start the lane change assist control in a situation where the other vehicle is present which is the hindrance.

However, even when the lane change assist control is permitted to be started while monitoring the surroundings, a case may arise where still another vehicle excessively approaches the own vehicle thereafter. For example, as illustrated in FIG. 17, a case may arise where the other vehicle C2 traveling in the adjacent lane (target lane) which is a lane change destination lane rapidly approaches the own vehicle C1 at an unexpected relative speed from a position behind the own vehicle C1. A case may also arise where the other vehicle C3 enters the target lane from a lane adjacent to the target lane (the lane which is two lanes away from the original lane) and then excessively approaches the own vehicle C1. The device proposed in Japanese Patent Application Laid-open No. 2016-126360 does not take into consideration the situation where the other vehicle excessively approaches the own vehicle after the lane change assist control has been started, and thus, can not take an appropriate action for this situation.

SUMMARY OF THE INVENTION

The present invention has been made in order to solve the above-mentioned problems and has an object to improve safety when an other vehicle approaches an own vehicle excessively after a lane change assist control has been started.

In order to achieve the above-mentioned object, a steering assist device according to one of embodiments of the present invention includes:

surrounding monitoring means (11) for monitoring surroundings of an own vehicle;

lane recognition means (12) for recognizing a lane to obtain lane information including a relative positional relationship of the own vehicle with respect to the lane;

lane change assist control means (10, 20) for starting a lane change assist control to control, in response to a lane change assist request, a steering so as to have the own vehicle change lanes from an original lane in which the own vehicle is currently traveling toward a target lane adjacent to the original lane, based on the lane information, when an other vehicle which has a probability to be an obstacle when the own vehicle is changing lanes is not detected by the surrounding monitoring means.

The steering assist device further includes:

lane change assist stop means (S17, S19, S30, S40) for stopping the lane change assist control, when the surrounding monitoring means detects an approaching vehicle which has a probability of excessively approaching the own vehicle if the lane change assist control continues being performed, while the lane change assist control is being performed;

notification means (S42) for notifying a driver of the own vehicle that the lane change assist control is stopped halfway;

original lane return assist control means (S46, S48) for performing original lane return assist control to control the steering so as to have the own vehicle return to the original lane from the target lane, when the approaching vehicle is detected while the own vehicle is travelling in the target lane after entering the target lane so that the lane change assist control is stopped;

approaching vehicle-in-original-lane determination means (S45) for determining, based on monitoring information detected by the surrounding monitoring means, whether or not an original lane side vehicle is detected, the original lane side vehicle being an other vehicle having a probability of excessively approaching the own vehicle if the own vehicle is returned to the original lane; and lateral speed zero control means (S47, S48) for prohibiting the original lane return assist control means from performing the original lane return assist control, and for performing lateral speed zero control to control the steering so as to maintain a lateral speed which is a speed in a lane width direction of the own vehicle at zero, when the approaching vehicle-in-original-lane determination means determines that the original lane side vehicle is detected.

In the embodiment of the present invention, the surrounding monitoring means monitors the surroundings of the own vehicle. For example, the surrounding monitoring means monitors the other vehicle in the surroundings of the own vehicle so as to determine whether or not the other vehicle is present which has probability of excessively approaching the own vehicle is present. The lane recognition means recognizes the lane to obtain the lane information including the relative positional relationship of the own vehicle with respect to the lane. The lane is, for example, an area partitioned by white lines. Therefore, by recognizing the lane, it is possible to acquire the relative positional relationship of the own vehicle with respect to the lane.

The lane change assist control means starts, in response to the lane change assist request, the lane change assist control to control the steering so as to cause the own vehicle to change lanes from the original lane at which the own vehicle is traveling at the present time point to/toward the target lane adjacent to the original lane, based on the lane information, when the other vehicle which is the hindrance/obstacle when the own vehicle changes lanes is not detected by the surrounding monitoring means. As a result, the own vehicle changes lanes toward the target lane without requiring the driver to handle/operate a steering wheel.

Even when the lane change assist control is allowed/permitted to be started under the surrounding monitoring, there may be a case where the other vehicle excessively approaches the own vehicle afterwards. Thus, the steering assist device of the present invention includes the lane change assist stop means and the original lane return assist control means.

The lane change assist stop means stops the lane change assist control when the surrounding monitoring means detects, while the lane change assist control is being performed, the approaching vehicle which is likely to excessively approach (has a probability of excessively approaching) the own vehicle if the lane change assist control is further continued. When the lane change assist control is stopped, the notification means informs/notifies the driver that the lane change assist control is stopped halfway (in the middle). Further, the original lane return assist control means performs the original lane return assist control to control the steering so as to return the own vehicle from the target lane to the original lane, when the approaching vehicle is detected and thus the lane change assist control is stopped in a situation where the own vehicle has already entered the target lane and is traveling in the target lane. In this case, still an other vehicle traveling in the original lane may have a probability of excessively approaching the own vehicle abnormally.

In view of the above, the steering assist device includes the original lane approach vehicle determination means and the lateral speed zero control means. The original lane approach vehicle determination means determines whether or not the original lane side vehicle is detected. The original lane side vehicle is the other vehicle which is likely to excessively approach (has a probability of excessively approaching) the own vehicle when the own vehicle is returned to the original lane. The lateral speed zero control means performs the lateral speed zero control to control the steering so as to maintain the "lateral speed which is the speed in the lane width direction" at zero through prohibiting the original lane return assist control when the original lane side vehicle is detected by the original lane approach vehicle determination means. Therefore, the own vehicle travels in the formation direction of the target lane (i.e., the own vehicle travels along (parallelly to) the lane). This can prevent the own vehicle from moving toward the center side in the width direction of the target lane, and thus, it is possible to reduce the possibility of the collision between the own vehicle and the approaching vehicle and the possibility of the collision between the own vehicle and the original lane side vehicle (so as to assist the collision avoidance operation).

In this case, since the driver recognizes that the lane change assist control has been stopped halfway, the driver can start moving the own vehicle to an appropriate position through the driver's steering wheel operation by himself/herself. The steering assist device is a device for assisting the steering operation performed by the driver to generate the steering power (torque) for control in such a manner that the steering operation performed by the driver is prioritized. Therefore, the driver can move the own vehicle to the appropriate position through the driver's steering wheel operation by himself/herself even when the lateral speed zero control is being performed.

Thus, according to the embodiment of the present invention, the lateral speed zero control can ensure/provide a time (period) in which the steering wheel operation is handed over to the driver while ensuring safety. As a result, it is possible to improve a safety when the other vehicle excessively approaches the own vehicle after the lane change assist control is started.

A feature of one embodiment of the present invention resides in that the steering assist device further includes collision avoidance assist control means (S42~S44) for performing collision avoidance assist control to control the steering so as to decrease a yaw angle formed between a formation direction of a lane and a direction in which the own vehicle faces at an emergency speed higher than a speed at which the yaw angle changes through the original lane return assist control, when the approaching vehicle is detected while the own vehicle is travelling in the target lane after entering the target lane so that the lane change assist control is stopped, wherein,
the original lane return assist control means is configured to perform the original lane return assist control after the collision avoidance assist control is performed; and
the lateral speed zero control means is configured to perform the lateral speed zero control after the collision avoidance assist control is performed.

In one aspect of the present invention, the collision avoidance assist control means performs the collision avoidance assist control before any one of the original lane return assist control and the lateral speed zero control is performed. The collision avoidance assist control means controls the steering so as to decrease the yaw angle formed between the formation direction of the lane and the direction in which the own vehicle faces, at emergency speed (whose magnitude is) greater than the speed at which the yaw angle changes during the original lane return assist control, when the approaching vehicle is detected and the lane change assist control is stopped in the situation where the own vehicle has already entered the target lane and is travelling in the target lane. Here, reducing the yaw angle means decreasing an absolute value of the yaw angle. When the yaw angle is decreased at the emergency speed, for example, it is preferable that the steering be changed in a direction to decrease the yaw angle by using the maximum steering angle allowed in the steering assist device. Here "decreasing the yaw angle at the emergency speed greater/higher than the speed at which the yaw angle changes through the original lane return assist control" does not mean "momentarily decreasing the yaw angle at a greater/higher speed", but means "decreasing the yaw angle, for example, at the averaged speed greater/higher than the averaged speed at which the yaw angle changes during the original lane return assist control". Therefore, the lateral speed which is the speed of the own vehicle in the lane width direction can be reduced in a short time.

As a result, it is possible to quickly prevent the own vehicle from moving to the center side in the width direction of target lane to avoid the collision (or to assist collision avoidance) with respect to the approaching vehicle (that is, it is possible to reduce the possibility of the collision). Therefore, it is possible to ensure the safety in a short time, and to start either the original lane control or the lateral speed zero control immediately after that.

Further, since the lateral speed zero control is the same as controlling the steering in such a manner that the yaw angle is maintained at zero, the lateral speed zero control can be started smoothly from the time point at which the collision avoidance assist control is terminated.

In one aspect of the present invention, the lateral speed zero control means is configured to set a target position of the own vehicle in the lane width direction when performing the lateral speed zero control to a position of the own vehicle in the lane width direction at a time point at which the approaching vehicle is detected.

When the approaching vehicle is detected, the lane change assist is stopped and then the collision avoidance assist control starts to be performed. However, a case may occur where the own vehicle travels in the lane change direction to some extent due to a control delay, and the like. In view of the above, the lateral speed zero control means sets the target position of the own vehicle in the lane width direction when performing the lateral speed zero control to the position of the own vehicle in the lane width direction at the time point at which the approach vehicle was detected. Therefore, the position of the own vehicle in the lane width direction is returned to the position at the time point at which the approach vehicle was detected so that the own vehicle travels parallelly to the lane. As a result, it is possible to further improve safety.

One aspect of the present invention resides in that the steering assist device further comprised center return assist control means (S30) for performing center return assist control to control the steering so as to have the own vehicle return to a center position in the lane width direction of the original lane, when the approaching vehicle is detected while the own vehicle is travelling in the original lane so that the lane change assist control is stopped.

According to one aspect of the present invention described above, the center return assist control means performs the center return assist control to control the steering so as to return the own vehicle to the center position in the lane width direction of the original lane, when the approaching vehicle is detected and then the lane change assist control is stopped in the situation where the own vehicle is traveling within the original lane. Therefore, the own vehicle can be returned to an appropriate position (the center position in the original lane). As a result, safety and convenience can be improved.

In the above description, in order to facilitate understanding of the invention, reference symbols used in embodiments of the present invention are enclosed in parentheses and are assigned to each of the constituent features of the invention corresponding to the embodiments. However, each of the constituent features of the invention is not limited to the embodiments defined by the reference symbols.

DETAILED DESCRIPTION OF THE PREFERRED EMBODIMENT

A steering assist device for a vehicle according to an embodiment of the present invention will be described below with reference the drawings.

Figure 1:
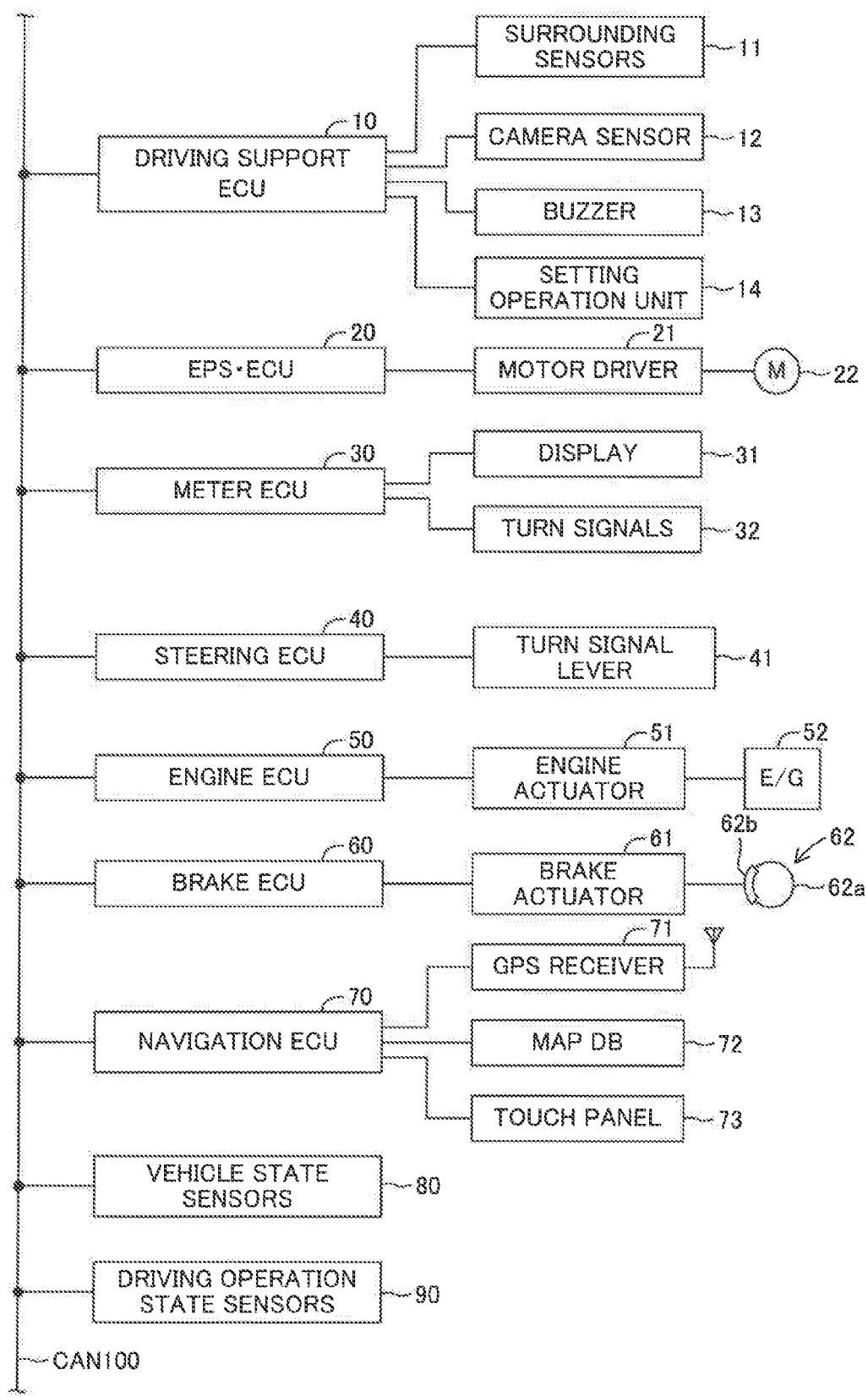
FIG. 1 is a schematic configuration diagram for illustrating a steering assist device according to an embodiment of the present invention.

The steering assist device according to the embodiment of the present invention is applied to a vehicle (hereinafter also referred to as an "own vehicle" in order to distinguish the vehicle from other vehicles), and as illustrated in FIG. 1, includes a driving support ECU 10, an electric power steering ECU 20, a meter ECU 30, a steering ECU 40, an engine ECU 50, a brake ECU 60, and a navigation ECU 70.

Those ECUs are electric control units each including a microcomputer as a main part, and are connected to one another so as to be able to mutually transmit and receive information via a controller area network (CAN) 100. The microcomputer herein includes a CPU, a ROM, a RAM, a nonvolatile memory, an interface I/F, and the like. The CPU executes instructions (programs and routines) stored in the ROM to implement various functions. Some or all of those ECUs may be integrated into one ECU.

A plurality of types of vehicle state sensors 80 configured to detect a vehicle state and a plurality of types of driving operation state sensors 90 configured to detect a driving operation state are connected to the CAN 100. Examples of the vehicle state sensors 80 include a vehicle speed sensor configured to detect a travel speed of the vehicle, a longitudinal G sensor configured to detect an acceleration in a longitudinal direction of the vehicle, a lateral G sensor configured to detect an acceleration in a lateral direction of the vehicle, and a yaw rate sensor configured to detect a yaw rate of the vehicle.

Examples of the driving operation state sensors 90 include an accelerator operation amount sensor configured to detect an operation amount of an accelerator pedal, a brake operation amount sensor configured to detect an operation amount of a brake pedal, a brake switch configured to detect presence or absence of an operation on the brake pedal, a steering angle sensor configured to detect a steering angle, a steering torque sensor configured to detect a steering torque, and a shift position sensor configured to detect a shift position of a transmission.

Information (called "sensor information") detected by the vehicle state sensors 80 and the driving operation state sensors 90 is transmitted to the CAN 100. Each of the ECUs can utilize the sensor information transmitted to the CAN 100 as appropriate. The sensor information is information from a sensor connected to a specific ECU among the ECUs, and may be transmitted from that specific ECU to the CAN 100. For example, the accelerator operation amount sensor may be connected to the engine ECU 50. In this case, the sensor information indicative of the accelerator operation amount is transmitted from the engine ECU 50 to the CAN 100. For example, the steering angle sensor may be connected to the steering ECU 40. In this case, the sensor information indicative of the steering angle is transmitted from the steering ECU 40 to the CAN 100. The same applies to the other sensors. Further, there may be employed a configuration in which, without interposition of the CAN 100, the sensor information may be transmitted and received through direct communication between specific ECUs among the ECUs.

Figure 2:
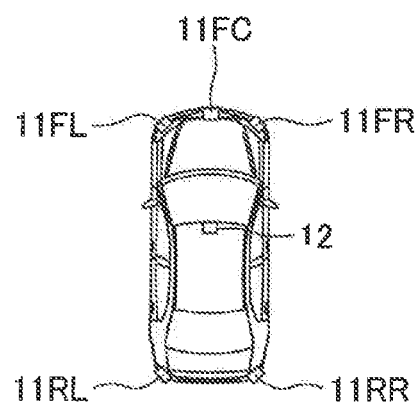
FIG. 2 is a plan view for illustrating attaching positions of surrounding sensors and a camera sensor.

The driving support ECU 10 is a control device serving as a main device for performing driving support for a driver, and performs a lane change assist control, a lane trace assist control, and an adaptive cruise control. As illustrated in FIG. 2, a front-center surrounding sensor 11FC, a front-right surrounding sensor 11FR, a front-left surrounding sensor 11FL, a rear-right surrounding sensor 11RR, and a rear-left surrounding sensor 11RL are connected to the driving support ECU 10. The surrounding sensors 11FC, 11FR, 11FL, 11RR, and 11RL are radar sensors, and basically have the same configuration as each other except that the sensors have different detection regions from each other. In the following, the surrounding sensors 11FC, 11FR, 11FL, 11RR, and 11RL are called "surrounding sensors 11" when the sensors are not required to be individually distinguished from one another.

Each of the surrounding sensors 11 includes a radar transceiver and a signal processor (not shown). The radar transceiver radiates a radio wave in a millimeter waveband (hereinafter referred to as a "millimeter wave"), and receives the millimeter wave (that is, a "reflected wave") reflected by a three-dimensional object (for example, an other vehicle, an pedestrian, a bicycle, and a building) present within a radiation range. The signal processor acquires, every time a predetermined time period elapses, information (hereinafter called "surrounding information") representing, for example, a distance between the own vehicle and the three-dimensional object, a relative speed between the own vehicle and the three-dimensional object, and a relative position (direction) of the three-dimensional object with respect to the own vehicle based on, for example, a phase difference between the transmitted millimeter wave and the received reflected wave, an attenuation level of the reflected wave, and a time period required from transmission of the millimeter wave to reception of the reflected wave. Then, the signal processor transmits the surrounding information to the driving support ECU 10. The surrounding information can be used to detect a longitudinal direction component and a lateral direction component in the distance between the own vehicle and the three-dimensional object and a longitudinal direction component and a lateral direction component in the relative speed between the own vehicle and the three-dimensional object.

As illustrated in FIG. 2, the front-center surrounding sensor 11FC is provided at a front-center portion of a vehicle body, and detects a three-dimensional object present in a front region of the own vehicle. The front-right surrounding sensor 11FR is provided at a front-right corner portion of the vehicle body, and mainly detects a three-dimensional object present in a front-right region of the own vehicle. The front-left surrounding sensor 11FL is provided at a front-left corner portion of the vehicle body, and mainly detects a three-dimensional object present in a front-left region of the own vehicle. The rear-right surrounding sensor 11RR is provided at a rear-right corner portion of the vehicle body, and mainly detects a three-dimensional object present in a rear-right region of the own vehicle. The rear-left surrounding sensor 11RL is provided at a rear-left corner portion of the vehicle body, and mainly detects a three-dimensional object present in a rear-left region of the own vehicle.

In this embodiment, the surrounding sensors 11 are radar sensors, but other sensors such as clearance sonars and light detection and ranging (LIDAR) sensors can be employed instead.

Further, a camera sensor 12 is connected to the driving support ECU 10. The camera sensor 12 includes a camera unit and a lane recognition unit configured to analyze image data obtained based on an image taken by the camera unit to recognize a white line of a road. The camera sensor 12 (camera unit) photographs a landscape in front of the own vehicle. The camera sensor 12 (lane recognition unit) repeatedly supplies information relating to the recognized white line to the driving support ECU 10 every time a predetermined calculation period elapses.

The camera sensor 12 is capable of recognizing a lane representing a region sectioned by white lines and is capable of detecting a relative positional relationship of the own vehicle with respect to the lane (relationship in position between the own vehicle and the lane) based on a positional relationship between the white lines and the own vehicle. The position of the own vehicle corresponds to (or is represented by) the center of gravity of the own vehicle. As will be described later, a lateral position of the own vehicle represents the position of the center of gravity of the own vehicle in the lane width direction, a lateral speed of the own vehicle represents the speed of the center of gravity of the own vehicle in the lane width direction, and a lateral acceleration of the own vehicle represents the acceleration of the center of gravity of the own vehicle in the lane width direction. The lateral position, the lateral speed, and the lateral acceleration are obtained based on the relative positional relationship between the white lines and the own vehicle detected by the camera sensor 12. The position of the own vehicle is represented by the center of gravity of the own vehicle in the present embodiment, however, the position of the own vehicle can be represented by a specific position set in advance (for example, the center position of the own vehicle in a planar view).

Figure 3:
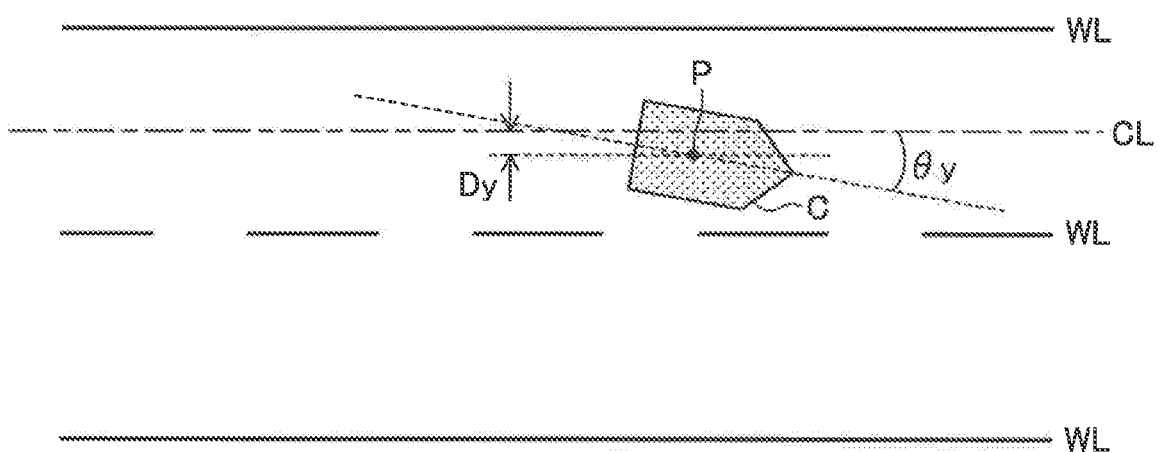
FIG. 3 is a diagram for illustrating lane-related vehicle information.

As illustrated in FIG. 3, the camera sensor 12 determines a lane center line CL corresponding to a center position in a width direction of right and left white lines WL defining a lane in which the own vehicle is traveling. The lane center line CL is used as a target travel line in lane trace assist control described later. Further, the camera sensor 12 calculates a curvature Cu of a curve of the lane center line CL.

The camera sensor 12 also calculates the position and the (traveling) direction of the own vehicle in the lane sectioned by the right and left white lines WL. For example, as illustrated in FIG. 3, the camera sensor 12 calculates a distance Dy (m) in a lane width direction between a center of gravity point P of the own vehicle C and the lane center line CL, namely, the distance Dy by which the own vehicle C is shifted/deviated from the lane center line CL in the lane width direction. This distance Dy is referred to as a "lateral deviation Dy". The camera sensor 12 also calculates an angle formed between the direction of the lane center line CL and the direction in which the own vehicle C faces (travels), namely, an angle θy (rad) by which the direction in which the own vehicle C faces is deviated from the direction of the lane center line CL in a horizontal plane. This angle θy is referred to as a "yaw angle θy". When the lane is curved, the lane center line CL is also curved, and thus the yaw angle θy represents (becomes equal to) the angle by which the direction in which the own vehicle C faces is deviated from the curved lane center line CL. In the following, information (Cu, Dy, and θy) representing the curvature Cu, the lateral deviation Dy, and the yaw angle θy is referred to as "lane-related vehicle information". The right and left directions of the lateral deviation Dy and the yaw angle θy with respect to the lane center line CL are identified by a sign (plus or minus) of values of those. Regarding the curvature Cu, the direction of the curve (right or left) is identified by a sign (plus or minus) of a value of the curvature Cu.

Further, the camera sensor 12 also supplies, to the driving support ECU 10, information on not only the lane of the own vehicle in which the own vehicle is traveling but also on lanes adjacent to the lane of the own vehicle ever time a predetermined calculation period elapses. When the white line is a solid line, the vehicle is inhibited from crossing the white line to change lanes. In contrast, when the white line is a broken line (white line intermittently formed at certain intervals), the vehicle is allowed to cross the white line to change lanes. The lane-related vehicle information (Cu, Dy, and θy) and the information relating to the white line(s) are collectively referred to as "lane information".

In this embodiment, the camera sensor 12 calculates the lane-related vehicle information (Cu, Dy, and θy). However, in place of the camera sensor 12, the driving support ECU 10 may acquire the lane information through analyzing the image data output from the camera sensor 12.

Further, the camera sensor 12 can also detect a three-dimensional object present in front of (ahead of) the own vehicle based on the image data. Therefore, the camera sensor 12 may obtain not only the lane information but also front surrounding information through calculation. In this case, for example, there may be provided a synthesis processor (not shown) configured to synthesize the surrounding information acquired by the front-center surrounding sensor 11FC, the front-right surrounding sensor 11FR, and the front-left surrounding sensor 11FL and the surrounding information acquired by the camera sensor 12 to generate front surrounding information having a high detection accuracy. The surrounding information generated by the synthesis processor may be supplied to the driving support ECU 10 as the front surrounding information on the own vehicle.

As illustrated in FIG. 1, a buzzer 13 is connected to the driving support ECU 10. The buzzer 13 generates a sound when receiving a buzzer sounding signal from the driving support ECU 10. The driving support ECU 10 sounds the buzzer 13 when, for example, the driving support ECU 10 notifies the driver of a driving support situation, or when the driving support ECU 10 alerts the driver.

In this embodiment, the buzzer 13 is connected to the driving support ECU 10, but the buzzer 13 may be connected to other ECUs, for example, a notification ECU (not shown) dedicated for notification, and the buzzer 13 may be sounded by the notification ECU. In this case, the driving support ECU 10 transmits a buzzer sounding command to the notification ECU.

Further, instead of or in addition to the buzzer 13, a vibrator for generating vibration for notification to the driver may be provided. For example, the vibrator is provided in a steering wheel to vibrate the steering wheel, to thereby alert the driver.

The driving support ECU 10 performs the lane change assist control, the lane trace assist control, and the adaptive cruise control, based on the surrounding information supplied from the surrounding sensors 11, the lane information obtained based on the white line recognition by the camera sensor 12, the vehicle state detected by the vehicle state sensors 80, the driving operation state detected by the driving operation state sensors 90, and the like.

A setting operation unit 14 to be operated by the driver is connected to the driving support ECU 10. The setting operation unit 14 is an operation unit for performing setting or the like regarding whether or not to perform each of the lane change assist control, the lane trace assist control, and the adaptive cruise control. The driving support ECU 10 receives a setting signal as input from the setting operation unit 14 to determine whether or not to perform each control. In this case, when the execution of the adaptive cruise control is not selected, the lane change assist control and the lane trace assist control are automatically set to be unexecuted. Further, when the execution of the lane trace assist control is not selected, the lane change assist control is automatically set to be unexecuted.

Further, the setting operation unit 14 has a function of inputting parameters or the like representing preference of the driver when the above-mentioned control is performed.

The electric power steering ECU 20 is a control device for an electric power steering device. In the following, the electric power steering ECU 20 is called an "EPS ECU 20". The EPS ECU 20 is connected to a motor driver 21. The EPS ECU 20 is connected to a motor driver 21. The motor driver 21 is connected to a steering motor 22. The steering motor 22 is integrated into a "steering mechanism including the steering wheel, a steering shaft coupled to the steering wheel, a steering gear mechanism, and the like" (not shown) of the vehicle. The EPS ECU 20 detects the steering torque that is input by the driver to the steering wheel (not shown) using a steering torque sensor provided to the steering shaft, and controls energization of the motor driver 21 based on the steering torque to drive the steering motor 22. The assist motor is driven as described above so that the steering torque is applied to the steering mechanism, and thus a steering operation of the driver is assisted.

Further, when the EPS ECU 20 receives a steering command from the driving support ECU 10 via the CAN 100, the EPS ECU 20 drives the steering motor 22 in accordance with a control amount indicated by the steering command to generate a steering torque. This steering torque represents a torque to be applied to the steering mechanism in response to the steering command from the driving support ECU 10, which does not require the driver's steering operation (steering wheel operation) unlike a steering assist torque to be applied for alleviating the driver's steering operation described above.

Even in a case where a steering command is received from the driving support ECU 10, when a steering torque from the steering wheel operation by the driver is detected and that steering torque is larger than a threshold, the EPS ECU 20 prioritizes the steering wheel steering performed by the driver to generate the steering assist torque that lightens the steering wheel operation.

The meter ECU 30 is connected to a display unit 31 and right and left turn signals 32 (meaning turn signal lamps and sometimes called "turn lamps"). The display unit 31 is, for example, a multi-information display provided in front of a driver's seat, and displays various types of information in addition to values measured by meters, for example, a vehicle speed. For example, when the meter ECU 30 receives a display command in accordance with the driving support state from the driving support ECU 10, the meter ECU 30 causes the display unit 31 to display a screen instructed in the display command. As the display unit 31, instead of or in addition to the multi-information display, a head-up display (not shown) can also be employed. When the head-up display is employed, it is preferred to provide a dedicated ECU for controlling the display on the head-up display.

Further, the meter ECU 30 includes a turn signal drive circuit (not shown). When the meter ECU 30 receives a turn signal flashing command via the CAN 100, the meter ECU 30 intermittently flashes the turn signal 32 arranged in a right or left side of the own vehicle, designated by the turn signal flashing command. Further, while the meter ECU 30 intermittently flashes the turn signal 32, the meter ECU 30 transmits, to the CAN 100, turn signal flashing information representing that the turn signal 32 is in a flashing state. Therefore, other ECUs can recognize the flashing state of the turn signal 32.

The steering ECU 40 is connected to a turn signal lever 41. The turn signal lever 41 is an operation unit for actuating (intermittently flashing) the turn signal 32, and is provided to a steering column. The turn signal lever 41 is provided to be swingable at a two-stage operation stroke about a support shaft in each of a counterclockwise operation direction and a clockwise operation direction.

Figure 4:
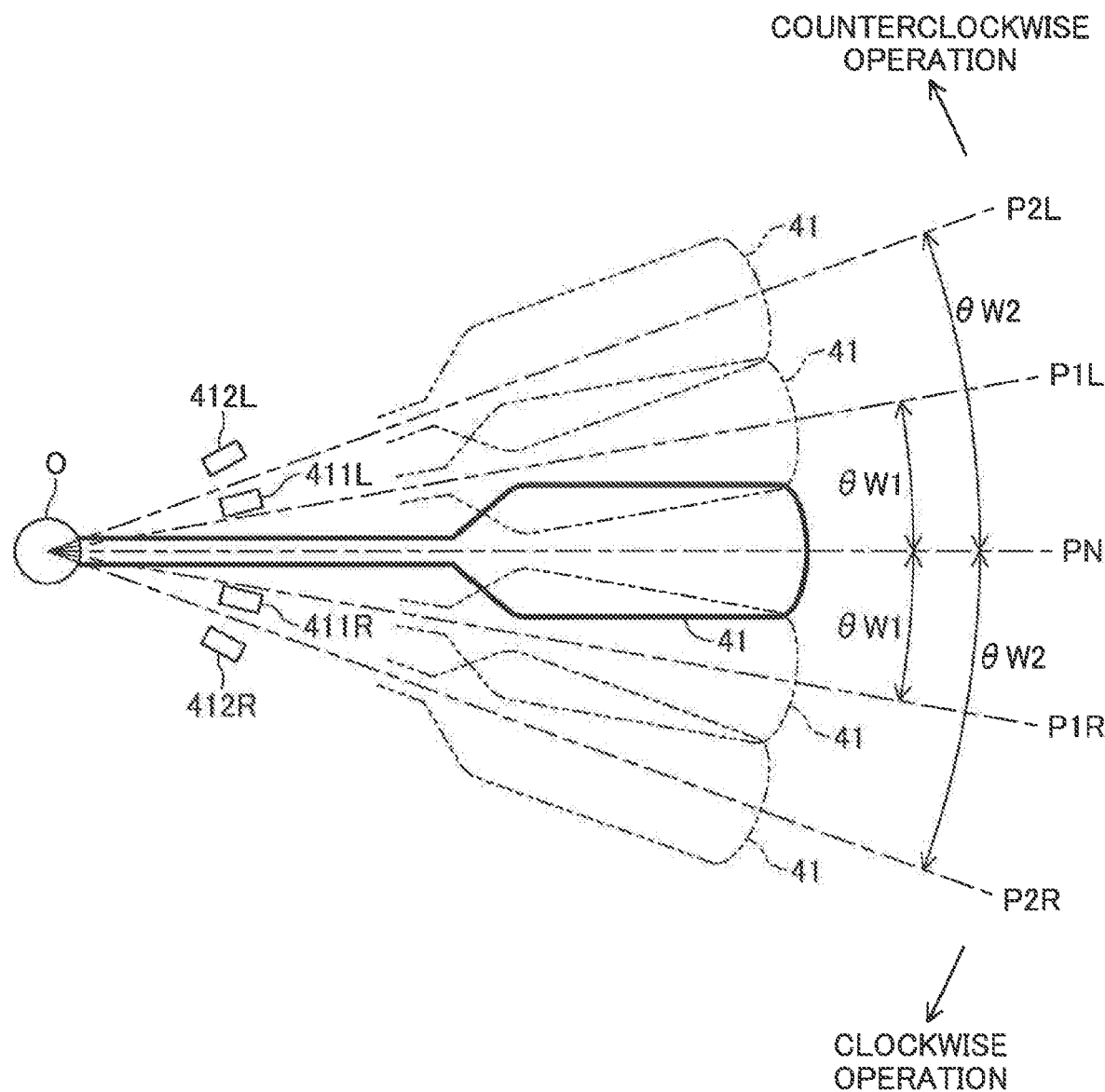
FIG. 4 is a diagram for illustrating actuation of a turn signal lever.

The turn signal lever 41 in this embodiment also acts as an operation device for requesting the lane change assist control by the driver. As illustrated in FIG. 4, the turn signal lever 41 is configured to be capable of being selectively operated between a first stroke position P1L (P1R), which is a position rotated by a first angle θW1 from a neutral position PN, and a second stroke position P2L (P2R), which is a position rotated by a second angle θW2 (>θW1) from the neutral position PN, in each of the clockwise operation direction and the counterclockwise operation direction about a support shaft O. When the turn signal lever 41 has been moved to the first stroke position P1L (P1R) by a lever operation by the driver, the turn signal lever 41 returns to the neutral position PN when a lever operation force by the driver is released/disappeared. When the turn signal lever 41 has been moved to the second stroke position P2L (P2R) by a lever operation by the driver, the turn signal lever 41 is held at the second stroke position P2L (P2R) by a lock mechanism even when the lever operation force is released/disappeared. Under a state in which the turn signal lever 41 is held at the second stroke position P2L (P2R), when the steering wheel is reversely rotated to be returned to the neutral position, or when the driver operates and returns the turn signal lever 41 to the neutral position, the locking by the lock mechanism is released, and the turn signal lever 41 is returned to the neutral position PN.

The turn signal lever 41 includes a first switch 411L (411R) that turns on (generates an ON signal) only when the turn signal lever 41 is positioned at the first stroke position P1L (P1R), and a second switch 412L (412R) that turns on (generates an ON signal) only when the turn signal lever 41 is positioned at the second stroke position P2L (P2R).

The steering ECU 40 detects the operation state of the turn signal lever 41 based on the presence/absence of the ON signal from the first switch 411L (411R) and the second switch 412L (412R). When the turn signal lever 41 is in a state tilted to the first stroke position P1L (P1R) and when the turn signal lever 41 is in a state tilted to the second stroke position P2L (P2R), the steering ECU 40 transmits, to the meter ECU 30, the turn signal flashing command including information representing the operation direction (right or left).

The steering ECU 40 outputs, when it is detected that the turn signal lever 41 has been continuously held at the first stroke position P1L (P1R) for a predetermined time (lane change request confirmation time: e.g., 1 second) or longer, to the driving support ECU 10 a lane change assist request signal including information indicating that operation direction (right or left). Therefore, when the driver wishes to receive lane change assist during driving, the driver is only required to tilt the turn signal lever 41 to the first stroke position P1L (P1R) in the lane change direction and maintain that state for the predetermined time or more. This operation is referred to as a "lane change assist request operation".

In this embodiment, the turn signal lever 41 is used as the operation device for the driver to request lane change assist (control). However, in place of the turn signal lever 41, a dedicated lane change assist request operation device may be arranged on the steering wheel, for example.

The engine ECU 50 illustrated in FIG. 1 is connected to an engine actuator 51. The engine actuator 51 is an actuator for changing an operation state of an internal combustion engine 52. In this embodiment, the internal combustion engine 52 is a gasoline fuel injection, spark ignition, multi-cylinder engine, and includes a throttle valve for adjusting an intake air amount. The engine actuator 51 includes at least a throttle valve actuator for changing an opening degree of the throttle valve. The engine ECU 50 can drive the engine actuator 51, thereby changing a torque generated by the internal combustion engine 52. The torque generated by the internal combustion engine 52 is transmitted to drive wheels (not shown) via a transmission (not shown). Thus, the engine ECU 50 can control the engine actuator 51 to control a driving force of the own vehicle, thereby changing an acceleration state (acceleration).

The brake ECU 60 is connected to a brake actuator 61. The brake actuator 61 is provided in a hydraulic circuit between a master cylinder (not shown) configured to pressurize a working fluid with a stepping force on a brake pedal and friction brake mechanisms 62 provided on the front/rear left/right wheels. The friction brake mechanisms 62 include a brake disk 62a fixed to the wheel and a brake caliper 62b fixed to a vehicle body. The brake actuator 61 is configured to adjust a hydraulic pressure supplied to a wheel cylinder integrated into the brake caliper 62b in accordance with a command from the brake ECU 60 to use the hydraulic pressure to operate the wheel cylinder, thereby pressing a brake pad against the brake disk 62a and generating a friction braking force. Thus, the brake ECU 60 can control the brake actuator 61, thereby controlling the braking force of the own vehicle to change a deceleration state (deceleration).

The navigation ECU 70 includes a GPS receiver 71 configured to receive a GPS signal for detecting a current position of the own vehicle, a map database 72 having map information and the like stored therein, and a touch panel (touch panel-type display) 73. The navigation ECU 70 identifies the position of the own vehicle at the current time point based on the GPS signal, and executes various types of calculation processing based on the position of the own vehicle and the map information and the like stored in the map database 72, to thereby perform route guidance with use of the touch panel 73.

The map information stored in the map database 72 includes road information. The road information includes parameters (e.g., road curvature radius or curvature, the road lane width, the number of road lanes, and the position of the lane center line of each road lane) indicative of the position and the shape of the road. Further, the road information includes road type information for enabling distinction of whether or not the road is a road for exclusive use by automobiles, for example.

Control Processes Executed by Driving Support ECU 10

Next, control processes executed by the driving support ECU 10 is described. While both of the lane trace assist control and the adaptive cruise control are being executed, the driving support ECU 10 performs the lane change assist control when the lane change assist request is accepted. In view of this, the lane trace assist control and the adaptive cruise control are first described.

Lane Trace Assist Control (LTA)

The lane trace assist control applies the steering torque to the steering mechanism so that the position of the own vehicle is maintained in a vicinity of the target travel line inside a "lane in which the own vehicle is traveling", thereby assisting the steering operation of the driver. In this embodiment, the target travel line is the lane center line CL, but a line offset in the lane width direction by a predetermined distance from the lane center line CL can also be adopted as the target travel line. Therefore, the lane trace assist control can be expressed as being control for assisting a steering operation so that the travel position of the own vehicle is maintained in a fixed position in the lane width direction in the lane.

Hereinafter, the lane trace assist control is called an "LTA". The LTA is widely known (e.g., refer to Japanese Patent Application Laid-open No. 2008-195402, Japanese Patent Application Laid-open No. 2009-190464, Japanese Patent Application Laid-open No. 2010-6279, and Japanese Patent No. 4349210) although the LTA itself has different names. Thus, a brief description is now given of the LTA.

The driving support ECU 10 is configured to perform the LTA when the LTA is requested through the operation on the setting operation unit 14. When the LTA is requested, the driving support ECU 10 calculates a target steering angle $\theta_{lta}^*$ every time a predetermined calculation period elapses in accordance with Expression (1) based on the above-mentioned lane-related vehicle information (Cu, Dy, and $\theta y$).

$$\theta_{lta}^* = K_{lta}1 \cdot Cu + K_{lta}2 \cdot \theta y + K_{lta}3 \cdot Dy + K_{lta}4 \cdot \Sigma Dy \quad (1)$$

In the Expression (1), $K_{lta}1$, $K_{lta}2$, $K_{lta}3$, and $K_{lta}4$ are control gains. The first term on the right-hand side is a steering angle component that is determined in accordance with the curvature Cu of the road and acts in a feed-forward manner. The second term on the right-hand side is a steering angle component that acts in a feed-back manner so that the yaw angle $\theta y$ is decreased (so that a difference between the direction of the own vehicle and the lane center line CL is decreased). That is, the second term on the right-hand side is the steering angle component calculated through feed-back control wherein the target value of the yaw angle $\theta y$ is set to zero. The third term on the right-hand side is a steering angle component that acts in a feed-back manner so that a lateral deviation difference Dy, which is a positional shift amount (positional difference) in the lane width direction of the own vehicle with respect to the lane center line CL, is decreased. That is, the third term on the right-hand side is the steering angle component calculated through feed-back control wherein the target value of the lateral deviation Dy is set to zero. The fourth term on the right-hand side is a steering angle component that acts in a feed-back manner so that an integral value $\Sigma Dy$ of the lateral deviation Dy is decreased. That is, the fourth term on the right-hand side is the steering angle component calculated through feed-back control wherein the target value of the integral value $\Sigma Dy$ is set to zero.

The target steering angle $\theta_{lta}^*$ is set to the steering angle for the left direction, for example, when the lane center line CL is curved in the left direction, and/or when the own vehicle is laterally shifted in the right direction with respect to the lane center line CL, and/or when the own vehicle is facing the right direction with respect to the lane center line CL. Further, the target steering angle $\theta_{lta}^*$ is set to the steering angle for the right direction when the lane center line CL is curved in the right direction, and/or when the own vehicle is laterally shifted in the left direction with respect to the lane center line CL, and/or when the own vehicle is facing the left direction with respect to the lane center line CL. Therefore, the driving support ECU 10 calculates the target steering angle $\theta_{lta}^*$ in accordance with the Expression (1) while using signs corresponding to the right/left directions.

The driving support ECU 10 outputs, to the EPS ECU 20, a command signal representing the target steering angle $\theta_{lta}^*$ that is the calculation result. The EPS ECU 20 controls the drive of the steering motor 22 so that the steering angle follows the target steering angle $\theta_{lta}^*$. In this embodiment, the driving support ECU 10 outputs the command signal representing the target steering angle $\theta_{lta}^*$ to the EPS ECU 20, but the driving support ECU 10 may calculate a target torque for obtaining the target steering angle $\theta_{lta}^*$, and output, to the EPS ECU 20, a command signal representing the target torque that is the calculation result.

Further, when the own vehicle is in the state where the own vehicle is likely to deviate from the lane, the driving support ECU 10 generates a lane departure warning by, for example, sounding the buzzer 13. The above is the outline of the LTA.

Adaptive Cruise Control (ACC)

The adaptive cruise control refers to the following control. When a preceding vehicle traveling ahead of (in front of) the own vehicle is present, the own vehicle is caused to follow the preceding vehicle while maintaining an inter-vehicle distance between the preceding vehicle and the own vehicle at a predetermined distance, based on the surrounding information. When no preceding vehicle is determined to be present based on the surrounding information, the own vehicle is caused to travel at a constant setting vehicle speed. In the following, the adaptive cruise control is referred to as an "ACC". The ACC itself is widely known (e.g., refer to Japanese Patent Application Laid-open No. 2014-148293, Japanese Patent Application Laid-open No. 2006-315491, Japanese Patent No. 4172434, and Japanese Patent No. 4929777). Thus, a brief description is now given of the ACC.

The driving support ECU 10 is configured to perform the ACC when the ACC is requested through the operation on the setting operation unit 14. That is, the driving support ECU 10 is configured to select a following target vehicle (that is, the vehicle to be tracked) based on the surrounding information acquired from the surrounding sensors 11 when the ACC is requested. For example, the driving support ECU 10 determines whether or not an other vehicle is present in a following target vehicle area defined in advance.

When an other vehicle is present in the following target vehicle area for a time equal to or longer than a predetermined time, the driving support ECU 10 selects that other vehicle as the following target vehicle, and sets a target acceleration so that the own vehicle follows the following target vehicle while keeping a predetermined inter-vehicle distance between the own vehicle and the following target vehicle. When the other vehicle is not present in the following target vehicle area, the driving support ECU 10 sets the target acceleration based on the set vehicle speed and the detected speed (vehicle speed detected by the vehicle speed sensor) so that the speed of the own vehicle becomes equal to the set vehicle speed.

The driving support ECU 10 uses the engine ECU 50 to control the engine actuator 51, and, when necessary, uses the brake ECU 60 to control the brake actuator 61 so that the acceleration of the own vehicle becomes equal to (matches) the target acceleration. When an accelerator operation is performed by the driver during the ACC, the accelerator operation is prioritized, and an automatic deceleration control for keeping the inter-vehicle distance between the preceding vehicle and the own vehicle is not performed. The above is the outline of the ACC.

<Lane Change Assist Control (LCA)>

The lane change assist control refers to the following control. When the surroundings of the own vehicle is monitored and it is determined that the own vehicle can safely change lanes, the steering torque is applied to the steering mechanism so that the own vehicle is moved from the lane in which the own vehicle is currently traveling to the adjacent lane while the surroundings of the own vehicle continues being monitored. Thus, the steering operation performed by the driver (lane change operation) is assisted. Therefore, with the lane change assist control, the lane in which the own vehicle travels can be changed without the steering operation by the driver (steering wheel operation). In the following, the lane change assist control is referred to as an "LCA".

Similarly to the LTA, the LCA is control of a lateral position of the own vehicle with respect to the lane, and is performed in place of the LTA when the lane change assist request is accepted while the LTA and the ACC are being performed. In the following, the LTA and the LCA are collectively referred to as a "steering assist control", and the state of the steering assist control is referred to as a "steering assist control state".

The steering assist device performs control for assisting the steering operation by the driver. Therefore, when the steering assist control (the LTA and the LCA) is being executed, the driving support ECU 10 generates the steering torque for steering assist control in such a manner that the steering wheel operation by the driver is prioritized. As a result, the driver can cause the own vehicle to move in an intended direction based on the steering wheel operation performed by the driver even when the steering assist control is being executed.

Figure 5:
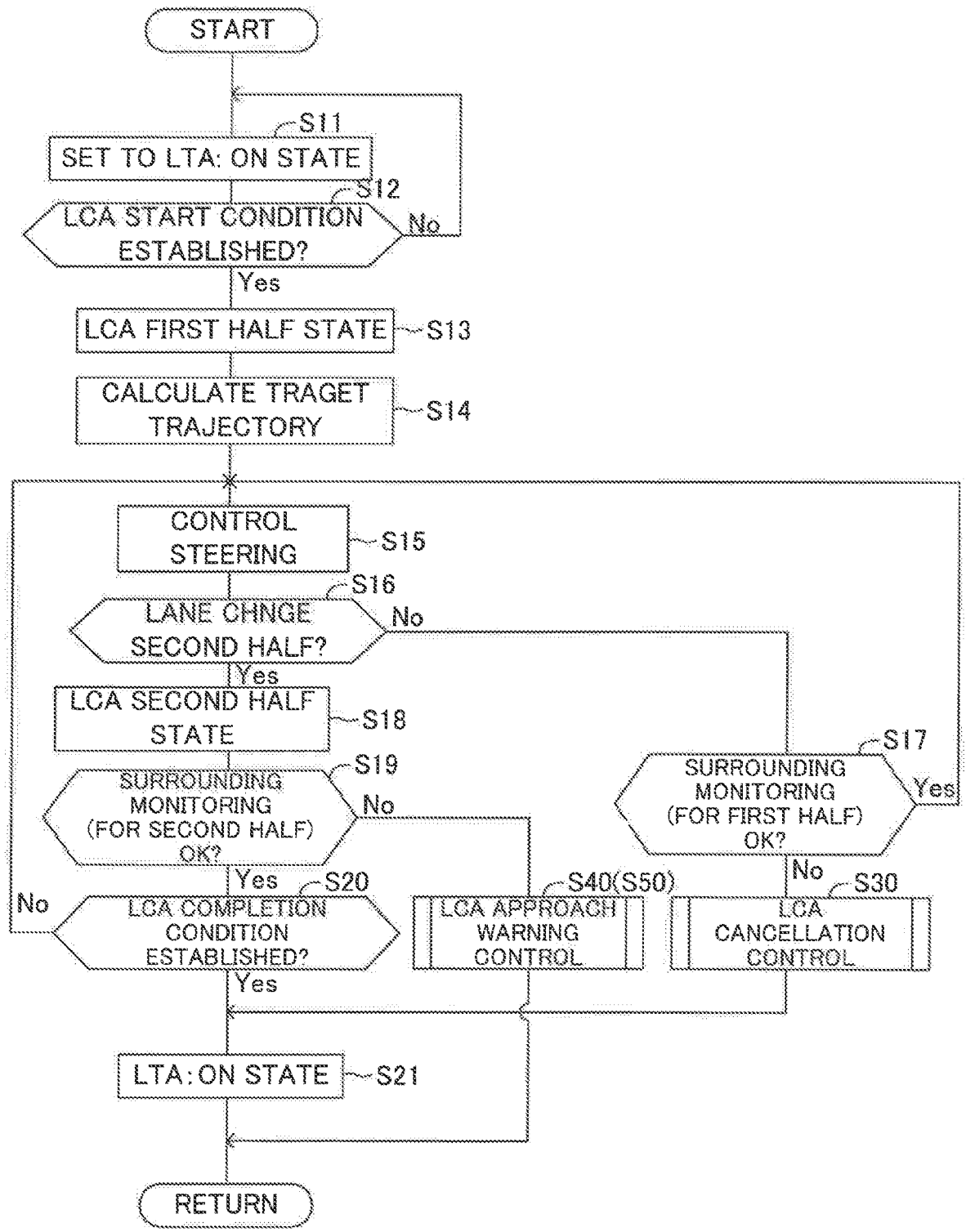
FIG. 5 is a flowchart for illustrating a steering assist control routine.

FIG. 5 is a flowchart for illustrating a steering assist control routine executed by the driving support ECU 10. The steering assist control routine is executed when an LTA execution permission condition is established. The LTA execution permission condition may be satisfied, for example, when an execution of the LTA is selected through the setting operation unit 14, the ACC is being performed, and the white lines of the lane are recognized by the camera sensor 12.

When and after the steering assist control routine is started, the driving support ECU 10 sets the steering assist control state to an LTA ON state at Step S11. The LTA ON state represents the control state in which the LTA is (to be) executed.

Next, at Step S12, the driving support ECU 10 determines whether or not an LCA start condition is established.

The LCA start condition is established when, for example, all of the following conditions are established.

1. A lane change assist request operation (lane change assist request signal) is detected.

2. The execution of the LCA is selected through the setting operation unit 14.

3. The white line which is present in the turn signal operation direction (the white line serving as a boundary between the original lane and the target lane) is a broken line.

4. The result of determining whether or not the LCA is allowed to be performed through the monitoring of the surroundings is YES (that is, an other vehicle or the like which has a probability to become an obstacle to changing lanes (during the lane change) is not detected based on the surrounding information acquired from the surrounding sensors 11, and thus, it is determined that the own vehicle can safely change lanes).

5. The road is the road for exclusive use by automobiles (road type information acquired from the navigation ECU 70 indicates a road exclusively for automobiles).

6. The vehicle speed of the own vehicle is within an LCA permitted vehicle speed range in which the LCA is allowed to be performed.

For example, the condition 4 is established when the inter-vehicle distance between the own vehicle and the other vehicle when the lane change is completed is predicted/estimated to be an appropriate distance or longer based on the relative speed between the own vehicle and the other vehicle traveling in the target lane.

It should be noted that the LCA start conditions are not limited to the above-mentioned conditions, and can be set as appropriate.

When it is determined that the LCA start condition is not established, the driving support ECU 10 returns the processing to Step S11, and continues to perform/execute the LTA.

When the LCA start condition is established while the LTA is being performed/executed (Step S12: Yes), the driving support ECU 10 starts the LCA in place of the LTA. In this case, the driving support ECU 10 sets the steering assist control state to an LCA first half state. The steering assist control state for the LCA is divided into the LCA first half state and an LCA second half state. The steering assist control state for the LCA is set to the LCA first half state at the start of the LCA. When the driving support ECU 10 sets the steering assist control state to the LCA first half state, it transmits an LCA execution display command to the meter ECU 30. As a result, the execution state of the LCA is displayed on the display unit 31.

Figure 8:
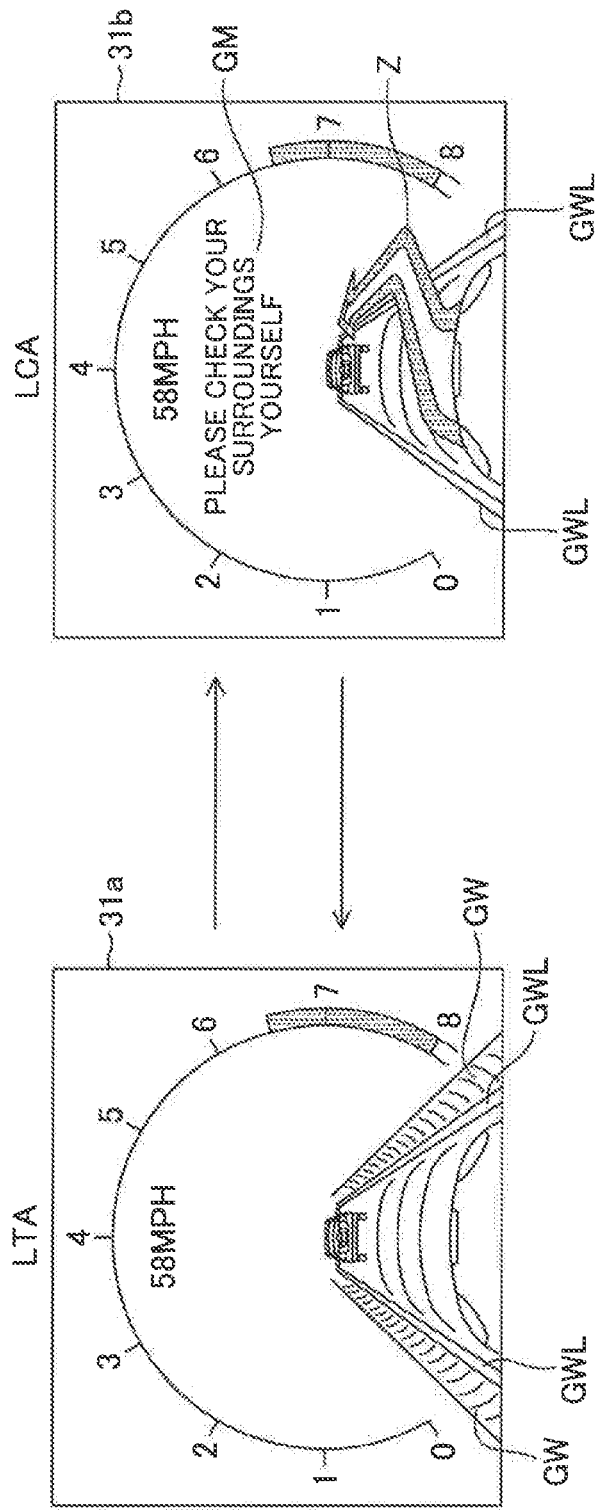
FIG. 8 is a diagram for illustrating an LTA screen and an LCA screen of a display.

FIG. 8 shows an example of a screen 31a (referred to as an "LTA screen 31a") displayed on the display unit 31 while the LAT is being performed and an example of a screen 31b (referred to as an "LCA screen 31b") displayed while the LCA is being performed. An image in which the own vehicle is traveling between the right and left white lines is displayed on the LTA screen 31a and on the LCA screen 31b. On the LTA screen 31a, virtual walls GW are displayed at an outer side of each of right and left white lines displayed as GWL. The driver can recognize from those walls GW that the own vehicle is being controlled so as to travel within the lane.

On the other hand, on the LCA screen 31b, the virtual walls GW are not displayed, but an LCA trajectory Z is displayed in place of the virtual walls GW. The driving support ECU 10 switches the screen to be displayed on the display unit 31 between the LTA screen 31a and the LCA screen 31b depending on the steering assist control state. As a result, the driver can easily discriminate/recognize which steering assist control is being performed, the LTA or the LCA.

The LCA is merely aimed to assist the steering operation performed by the driver for changing lanes. Thus, the driver is responsible for monitoring (or is required to pay attention to) the surroundings. Therefore, a message GM, namely, "Please check your surroundings by yourself", for causing the driver to monitor his or her surroundings is displayed on the LCA screen 31b.

When and after the LCA starts, the driving support ECU 10 firstly calculates the target trajectory at Step S14 of a routine illustrated in FIG. 5. The LCA target trajectory is now described.

Figure 9:
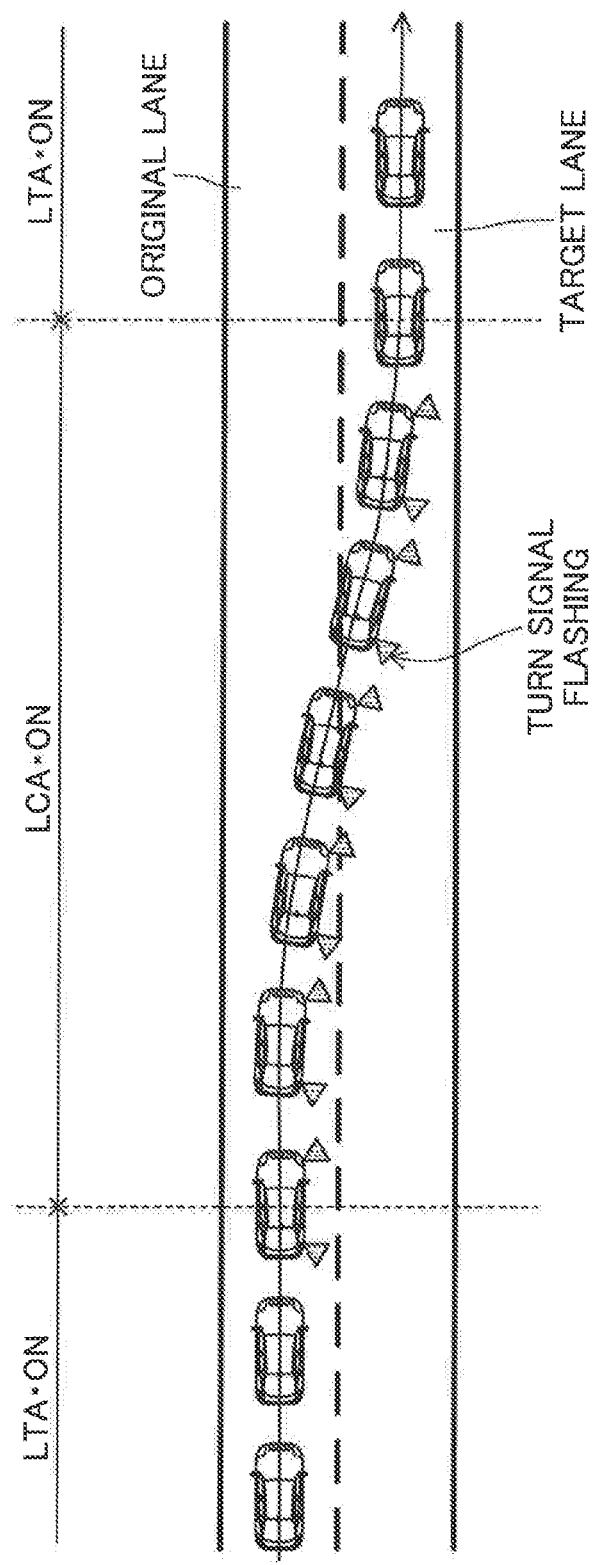
FIG. 9 is a diagram for illustrating a target trajectory.

When performing the LCA, the driving support ECU 10 determines a target trajectory function for representing/expressing/defining the target trajectory of the own vehicle. The target trajectory is a trajectory along which the own vehicle is to be moved, for a target lane change time period, from a lane (called an "original lane") in which the own vehicle is currently traveling to the center position in the width direction (called a "final target lateral position") of a lane (called a "target lane") present in the lane change assist request direction, which is adjacent to the original lane. The target trajectory has, for example, a shape as illustrated in FIG. 9.

The target trajectory function is, as described later, a function for calculating a target value of the lateral position (i.e., target lateral position) of the own vehicle with respect to the lane center line CL of the original lane serving as a reference, the target value corresponding to an elapsed time t which is a time from an LCA start time point (time point at which LCA start condition becomes established) and is a variable of the function. The lateral position of the own vehicle represents the position of the center of gravity of the own vehicle in the lane width direction (also referred to as a "lateral direction") with respect to the lane center line CL serving as a reference.

The target lane change time is varied in proportion to a distance (hereinafter referred to as a "required lateral distance") for which the own vehicle is to move in the lateral direction from an initial position to a final target lateral position. The initial position is an LCA start position (lateral position of the own vehicle at the LCA start time point). For example, when the lane width is 3.5 m as in the case of general roads, the target lane change time is set to, for example, 8.0 seconds. This example corresponds to a case in which the own vehicle is positioned on the lane center line CL of the original lane at the LCA start time point. The target lane change time is adjusted in proportion to the width of the lane. Therefore, the target lane change time is set to a larger value as the lane is wider, and conversely, to a smaller value as the lane is narrower.

Further, when the lateral-direction position of the own vehicle at the LCA start time point is shifted/deviated to the lane change side with respect to the lane center line CL of the original lane, the target lane change time is made smaller as the shift amount (lateral deviation Dy) of the own vehicle is larger. On the other hand, when the lateral-direction position of the own vehicle at the start of the LCA is shifted/deviated to the opposite side of the lane change side with respect to the lane center line CL of the original lane, the target lane change time period is made smaller as the shift amount (lateral difference Dy) is larger. For example, when the shift amount is 0.5 m, the increase/decrease adjustment amount of the target lane change time may be 1.14 seconds (=8.0×0.5/3.5). The values for the target lane change time described here are mere examples, and are arbitrarily values can be used.

In this embodiment, a target lateral position y is calculated based on a target trajectory function y(t) represented by Expression (2) below. The target trajectory function y(t) is a fifth-order function with the elapsed time t as the variable.

$$y(t) = c_0 + c_1 \cdot t + c_2 \cdot t^2 + c_3 \cdot t^3 + c_4 \cdot t^4 + c_5 \cdot t^5 \quad (2)$$

This target trajectory function y(t) is set to a function such that the own vehicle is smoothly moved to the final target position.

In the Expression (2), the coefficients $c_0$, $c_1$, $c_2$, $c_3$, $c_4$, and $c_5$ are determined based on a state (referred to as an "initial lateral state amount") of the own vehicle when the LCA is started and a target state (referred to as a "final target lateral state amount) of the own vehicle when the LCA is completed.

Figure 10:
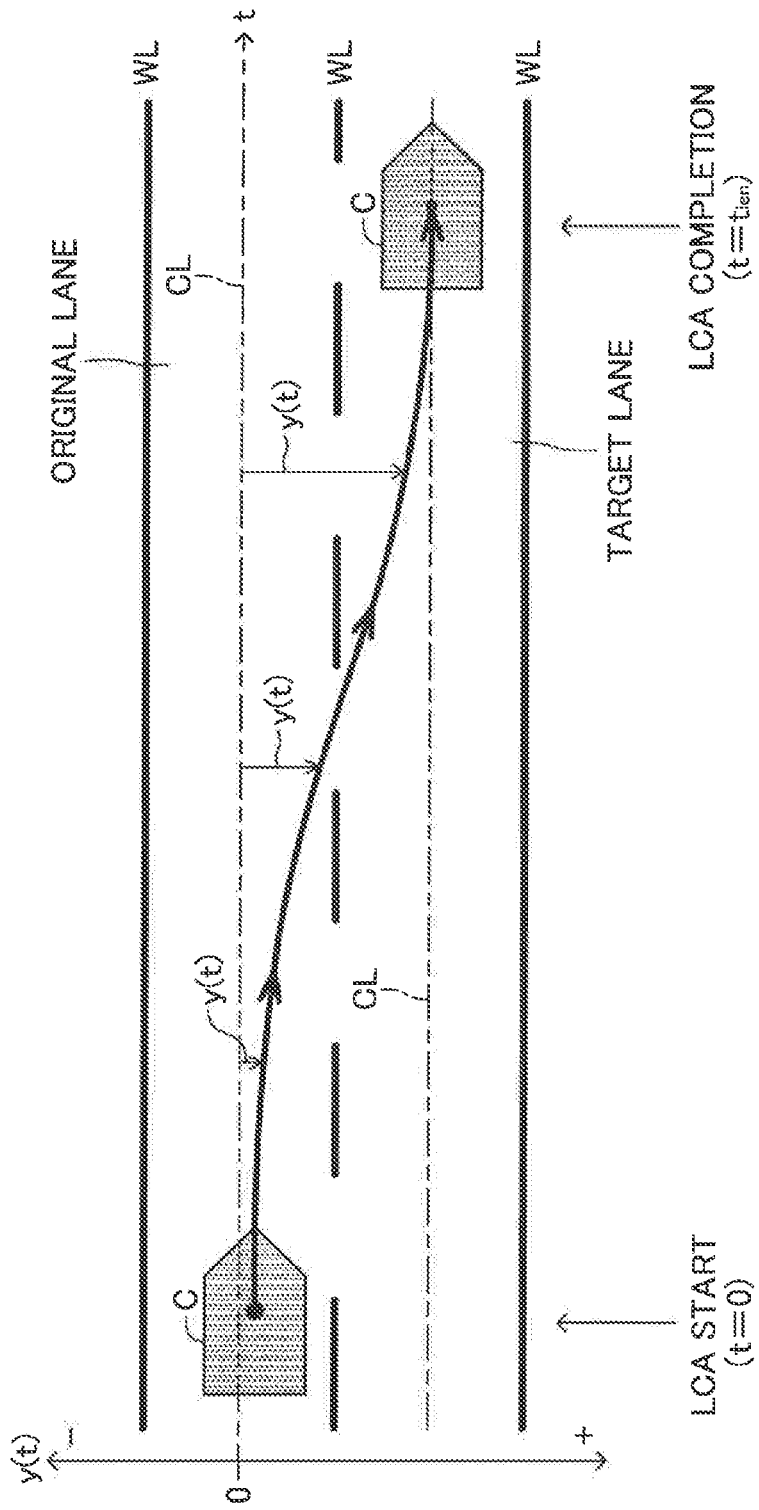
FIG. 10 is a diagram for illustrating a target trajectory function.

An example of the target trajectory function y(t) is illustrated in FIG. 10. As described above, the target trajectory function y(t) is a function for calculating the target lateral position y(t) of the own vehicle C with respect to the lane center line CL of the original lane in which the own vehicle C is currently traveling, the target lateral position y(t) corresponding to the elapsed time t (sometimes referred to as a "current time t") from the LCA start time point (or the time point at which the target trajectory is calculated). In the example shown in FIG. 10, the lane is straight. When the lane is a curved lane, the target lateral position of the own vehicle is calculated through the target trajectory function y(t) as a lateral position with respect to the lane center line CL which has a curved shape corresponding the curved lane.

The driving support ECU 10 sets target trajectory calculation parameters in the following manner in order to determine the coefficients $c_0$, $c_1$, $c_2$, $c_3$, $c_4$, and $c_5$ of the target trajectory function y(t). The target trajectory calculation parameters include the following seven parameters (P1 to P7).

P1: a lateral position (referred to as an "initial lateral position") of the own vehicle relative to the lane center line of the original lane when the LCA is started (or at the LCA start time point).

P2: a speed (referred to as an "initial lateral speed") of the own vehicle in the lateral direction when the LCA is started (or at the LCA start time point).

P3: an acceleration (referred to as an "initial lateral acceleration") of the own vehicle in the lateral direction when the LCA is started (or at the LCA start time point).

P4: a target lateral position (referred to as the "final target lateral position") of the own vehicle relative to the lane center line of the original lane when the LCA is completed (referred to as an "LCA completion time point").

P5: a target speed (referred to as a "final target lateral speed") of the own vehicle in the lateral direction when the LCA is completed.

P6: a target acceleration (referred to as a "final target lateral acceleration") of the own vehicle in the lateral direction when the LCA is completed.

P7: a target time (referred to as the "target lane change time"), which is a target value of the time for performing the LCA (time from the LCA start time point to the LCA completion time point).

As described above, the lateral direction is the lane width direction. Therefore, the lateral speed represents the speed of the own vehicle in the width direction of the lane, and the lateral acceleration represents the acceleration of the own vehicle in the width direction of the lane.

The processes for setting those seven target trajectory calculation parameters is referred to as an "initialization processing". In this initialization processing, the target trajectory calculation parameters are set in the following manner. That is, the initial lateral position is set to a value equal to the lateral deviation Dy detected by the camera sensor 12 when the LCA is started (or at the LCA start time point). The initial lateral speed is set to a value (v·sin(θy)) obtained by multiplying a vehicle speed v detected by the vehicle speed sensor at the LCA start time point by a sine value sin(θy) of the yaw angle θy detected by the camera sensor 12 at the LCA start time point. The initial lateral acceleration is set to a value (v·γ) obtained by multiplying a yaw rate γ (rad/s) detected by the yaw rate sensor at the LCA start time point by the vehicle speed v at the LCA start time point. Instead, the initial lateral acceleration may be set to a derivative value of the initial lateral speed. The initial lateral position, the initial lateral speed, and the initial lateral acceleration are collectively referred to as the "initial lateral state amount".

The driving support ECU 10 is designed/configured to regard the lane width of the target lane as a lane width equal to the lane width of the original lane detected by the camera sensor 12. Therefore, the final target lateral position is set to the same value as the lane width of the original lane (i.e., the final target lateral position=the lane width of original lane). The driving support ECU 10 sets each of the final target lateral speed and the final target acceleration to zero. The final target lateral position, the final target lateral speed, and the final target lateral acceleration are collectively referred to as the "final target lateral state amount".

The target lane change time is, as described above, calculated based on the lane width (the lane width of the original lane may be used) and the lateral-direction shift amount of the own vehicle when the LCA is started (or at the LCA start time point). For example, the target lane change time $t_{len}$ is calculated by Expression (3) below.

$$t_{len}=D_{ini}\cdot A \quad (3)$$

In the Expression (3), $D_{ini}$ is a required distance which is a distance for which the own vehicle is required to be moved in the lateral direction from the LCA start position (initial lateral position) to the LCA completion position (final target lateral position). Therefore, when the own vehicle is positioned on the lane center line CL of the original lane at the LCA start time point, $D_{ini}$ is set to a value equal to the lane width. When the own vehicle is shifted/deviated from the lane center line CL of the original lane at the LCA start time point, $D_{ini}$ is set to a value obtained by adding or subtracting that shift amount to or from the lane width. The constant (coefficient) A is a constant (referred to as a "target time setting constant") representing the target time to be taken in order to move the own vehicle in the lateral direction by a unit distance. For example, the constant A is set to a value of 8 sec/3.5 m (=2.29 sec/m). Accordingly, for example, when the required distance $D_{ini}$ for which the own vehicle is required to be moved in the lateral direction is 3.5 m, the target lane change time $t_{len}$ is set to 8 seconds.

The target time setting constant A is not limited to the above-mentioned value, and can be set arbitrarily. For example, the target time setting constant A may be set to a value selected from a plurality of values in accordance with a preference of the driver using the setting operation unit 14. Alternatively, the target time setting constant A may be a fixed value.

The driving support ECU 10 calculates the coefficients $c_0$, $c_1$, $c_2$, $c_3$, $c_4$, and $c_5$ of the target trajectory function y(t) represented by the Expression (2) based on "the initial lateral state amount, the final target lateral state amount, and the target lane change time" determined through the initialization processing of the target trajectory calculation parameters, to thereby finalize/fix the target trajectory function y(t).

From the target trajectory function y(t) represented by the Expression (2), a lateral speed y'(t) of the own vehicle can be represented by Expression (4), and a lateral acceleration y''(t) of the own vehicle can be represented by Expression (5).

$$y'(t)=c_1+2c_2\cdot t+3c_3\cdot t^2+4c_4\cdot t^3+5c_5\cdot t^4 \quad (4)$$

$$y''(t)=2c_2+6c_3\cdot t+12c_4\cdot t^2+20c_5\cdot t^3 \quad (5)$$

In the Expressions (4) and (5), when the initial lateral position is expressed as $y_0$, the initial lateral speed is expressed as $vy_0$, the initial lateral acceleration is expressed as $ay_0$, the final target lateral position is expressed as $y_1$, the final target lateral speed is expressed as $vy_1$, the final target lateral acceleration is expressed as $ay_1$, and the lane width of the original lane is expressed as W, the following relational expressions are obtained based on the above-mentioned target trajectory calculation parameters.

$$y(0)=c_0=y_0 \quad (6)$$

$$y'(0)=c_1=vy_0 \quad (7)$$

$$y''(0)=2c_2=ay_0 \quad (8)$$

$$y(t_{len})=c_0+c_1\cdot t_{len}+c_2\cdot t_{len}^2+c_3\cdot t_{len}^3+c_4\cdot t_{len}^4+c_5\cdot t_{len}^5=y_1=W \quad (9)$$

$$y'(t_{len})=c_1+2c_2\cdot t_{len}+3c_3\cdot t_{len}^2+4c_4\cdot t_{len}^3+5c_5\cdot t_{len}^4=vy_1=0 \quad (10)$$

$$y''(t_{len})=2c_2+6c_3\cdot t_{len}+12c_4\cdot t_{len}^2+20c_5\cdot t_{len}^3=ay_1=0 \quad (11)$$

Therefore, the values of the coefficients $c_0$, $c_1$, $c_2$, $c_3$, $c_4$, and $c_5$ of the target trajectory function y(t) can be calculated from the six Expressions (6) to (11). The target trajectory function y(t) is fixed/finalized by substituting the values of the calculated coefficients $c_0$, $c_1$, $c_2$, $c_3$, $c_4$, and $c_5$ into the Expression (2). The driving support ECU 10 stores and maintains that fixed/finalized target trajectory function y(t) until the LCA is terminated. At the same time as finalizing the target trajectory function y(t), the driving support ECU 10 also activates a clock timer (initial value: zero) to start counting the elapsed time t from the LCA start time point.

When the target trajectory function has been fixed/finalized in the above manner, the driving support ECU 10 performs steering control based on the target trajectory function at Step S15. The steering control is now specifically described.

First, the driving support ECU 10 calculates a target lateral state amount of the own vehicle at the current time point. The target lateral state amount includes:

the target lateral position which is a target value for/of the lateral position of the own vehicle in the lane width direction;

the target lateral speed which is a target value for/of the speed (lateral speed) of the own vehicle in the lane width direction; and the target lateral acceleration which is a target value for/of t the acceleration (lateral acceleration) of the own vehicle in the lane width direction.

The lateral speed and the lateral acceleration are sometimes collectively referred to as a "lateral movement state amount", and the target lateral speed and the target lateral acceleration are sometimes collectively referred to as the "target lateral movement state amount".

The driving support ECU 10 calculates, based on the target trajectory function y(t) finalized at Step S14 and the current time t, the target lateral position at the current time point, the target lateral speed at the current time point, and the target lateral acceleration at the current time point. The current time t is the time that has elapsed since the target trajectory function y(t) was finalized at Step S14, and is the same as the elapsed time from the start of the LCA. When the target trajectory function y(t) is finalized at Step S14, the driving support ECU 10 resets the clock timer and starts to count the elapsed time t (=current time t) from the start of the LCA (LCA start time point). The target lateral position is calculated through substituting the current time t into the target trajectory function y(t). The target lateral speed is calculated through substituting the current time t into a function y'(t) obtained through first-order differentiation of the target trajectory function y(t), and the target lateral acceleration is calculated through substituting the current time t into a function y''(t) obtained through second-order differentiation of the target trajectory function y(t). The driving support ECU 10 reads the elapsed time t measured by the clock timer to calculate the target lateral state amount based on the measured time t and the above-mentioned functions.

In the following description, the target lateral position at the current time is expressed as y*, the target lateral speed at the current time is expressed as vy*, and the target lateral acceleration at the current time is expressed as ay*.

Subsequently, the driving support ECU 10 calculates a target yaw state amount which is a target amount relating to movement for changing the direction of the own vehicle. The target yaw state amount includes a target yaw angle θy* of the own vehicle at the current time point, a target yaw rate γ* of the own vehicle at the current time point, and a target curvature Cu* at the current time point. The target curvature Cu* is the curvature of the trajectory for causing the own vehicle to change lanes, namely, the curvature of the curve component relating only to the lane change. In other words, the target curvature Cu* does not include the curvature of the lane.

The driving support ECU 10 reads the vehicle speed v at the current time point (the current vehicle speed detected by the vehicle speed sensor at the current time), and calculates the target yaw angle θy* at the current time point, the target yaw rate γ* at the current time point, and the target curvature Cu* at the current time point by using Expressions (12), (13), and (14) described below, based on the read vehicle speed v, a target lateral speed vy*, and a target lateral acceleration ay*.

$$\theta y^* = \sin^{-1}(vy^*/v) \tag{12}$$

$$\gamma^* = ay^*/v \tag{13}$$

$$Cu^* = ay^*/v^2 \tag{14}$$

Specifically, the target yaw angle θy* is calculated through substituting a value obtained by dividing the target lateral speed vy* by the vehicle speed v into an arcsine function. The target yaw rate γ* is calculated through dividing the target lateral acceleration ay* by the vehicle speed v. The target curvature Cu* is calculated through dividing the target lateral acceleration ay* by the square of the vehicle speed v.

Next, the driving support ECU 10 calculates a target control amount of the LCA. In this embodiment, a target steering angle $\theta_{lca}^*$ is calculated as the target control amount. The target steering angle $\theta_{lca}^*$ is calculated through Expression (15) based on the target lateral position y*, the target yaw angle θy*, the target yaw rate γ*, the target curvature Cu*, and the curvature Cu, calculated in the manner described above.

$$\theta_{lca}^* = K_{lca}1 \cdot (Cu^* + Cu) + K_{lca}2 \cdot (\theta y^* - \theta y) + K_{lca}3 \cdot (y^* - y) + K_{lca}4 \cdot (\gamma^* - \gamma) + K_{lca}5 \cdot \Sigma(y^* - y) \tag{15}$$

In the Expression (15), each of $K_{lca}1$, $K_{lca}2$, $K_{lca}3$, $K_{lca}4$, and $K_{lca}5$ represents a control gain. The parameter Cu represents the curvature at the current time point (at the calculation of $\theta_{lca}^*$) detected by the camera sensor 12. The parameter y represents the lateral position at the current time point (at the calculation of) detected by the camera sensor 12, namely, y corresponds to Dy. The parameter θy represents the yaw angle at the current time point (at the calculation of $\theta_{lca}^*$ detected by the camera sensor 12. The parameter γ represents the yaw rate of the own vehicle at the current time point detected by the yaw rate sensor. The derivative value of the yaw angle θy can alternatively be used as γ.

The first term on the right-hand side is a feed-forward control amount determined in accordance with a value obtained by adding the target curvature Cu* and the curvature Cu (curve of the lane). $K_{lca}1 \cdot Cu^*$ is the feed-forward control amount for performing lane change. $K_{lca}1 \cdot Cu$ is the feed-forward control amount for causing the own vehicle to travel along the curve of the lane. Therefore, the control amount represented by the first term on the right-hand side is basically set to a value capable of causing the own vehicle to travel along a target travel path when the steering angle is controlled according to that control amount. In this case, the control gain $K_{lca}1$ is set to a value that varies depending on the vehicle speed v. For example, the control gain $K_{lca}1$ may be set in accordance with Expression (16) below based on a wheel base L and a stability factor Ksf (fixed value determined for each vehicle). In this case, K is a fixed control gain.

$$K_{lca}1 = K \cdot L \cdot (1 + Ksf \cdot v^2) \tag{16}$$

Each of the second to fifth terms on the right-hand side in the Expression (15) represents a feedback control amount. The second term on the right-hand side represents a steering angle component for providing feedback so as to reduce a deviation between the target yaw angle θy* and an actual yaw angle θy. The third term on the right-hand side represents a steering angle component for providing feedback so as to reduce a deviation between the target lateral position y* and an actual lateral position y. The fourth term on the right-hand side represents a steering angle component for providing feedback so as to reduce a deviation between the target yaw rate γ* and an actual yaw rate γ. The fifth term on the right-hand side represents a steering angle component for providing feedback so as to reduce an integral value Σ(y*−Y) of a deviation between the target lateral position y* and the actual lateral position y.

The target steering angle $\theta_{lca}^*$ is not limited to an angle calculated based on the above-mentioned five steering components. The target steering angle $\theta_{lca}^*$ may be calculated using only arbitrary steering components selected from those five steering components, or may also be calculated using other steering components in addition to the five steering components. For example, regarding the feedback control amount relating to yaw movement, any one of a deviation in the yaw angle and a deviation in the yaw rate can be used. Further, the feedback control amount obtained using the integral value Σ(y*−γ) of the deviation between the target lateral position y* and the actual lateral position y can be omitted.

After the target control amount has been calculated, the driving support ECU 10 transmits the steering command representing the target control amount to the EPS ECU 20. In this embodiment, the driving support ECU 10 calculates the target steering angle $\theta_{lca}^*$ as the target control amount, but the driving support ECU 10 may calculate a target torque for obtaining the target steering angle $\theta_{lca}^*$, and transmit a steering command representing that target torque to the EPS ECU 20. The processing described above is the processing of Step S15.

When the EPS ECU 20 receives the steering command from the driving support ECU 10 via the CAN 100, the EPS ECU 20 drives the steering motor 22 in such a manner that the steering angle follows (becomes equal to) the target steering angle $\theta_{lca}^*$.

Subsequently, the driving support ECU 10 determines whether or not a lane change progress status is the second half state, at Step S16.

Determination as to which the lane change progress status is, the first half or the second half, is now described. The driving support ECU 10 compares the position of the reference point of the own vehicle (the center of gravity of the vehicle in the present embodiment) with a preset determination position, to thereby determine which the lane change progress status is, the first half state or the second half state. When the position of the reference point of the own vehicle (hereinafter, simply also referred to as a "position of the own vehicle" or a "lateral position") is in a side opposite to the lane change side (that is, is in the original lane side) with respect to the determination position, the driving support ECU 10 determines that the lane change progress status is the first half state. When the lateral position of the own vehicle is in the lane change side with respect to the determination position, the driving support ECU 10 determines that the lane change progress status is the second half state.

As will be described later, the driving support ECU 10 monitors surrounding vehicles based on the surrounding information obtained by the surrounding sensors 11 while performing the LCA. When the driving support ECU 10 detects an other vehicle(s) (sometimes referred to as an "approaching vehicle") which is likely to approach the own vehicle excessively/abnormally (too closely to the own vehicle) in the target lane if the LCA continues being performed, the driving support ECU 10 stops/terminates performing the LCA. If the own vehicle can be prevented from protruding/deviating from the original lane, the approaching vehicle will not collide with the own vehicle. On the other hand, when the own vehicle has already entered the target lane, it is necessary to avoid/prevent a collision between the own vehicle and the approaching vehicle.

In view of the above, the driving support ECU 10 of the present embodiment detects/grasps the progress status of the lane change to select the processing to be carried out when the approaching vehicle has been detected depending on which the lane change progress status is, the first half state or the second half state. For this reason, the driving support ECU 10 determines which the lane change progress status is, the first half state or the second half state (determines whether the progress status of lane change is the first half state or the second half state). The progress status of the lane change is determined based on the lane information detected by the camera sensor 12.

Example 1 of the Method for Determining of the First Half State or the Second Half State For example, when it is estimated that the entire body of the own vehicle is located within the original lane, the driving support ECU 10 determines that the progress status of the lane change is the first half state. When it is estimated that at least a part of the body of the vehicle protrudes from the original lane to the target lane, the driving support ECU 10 determines that the progress status of the lane change is the second half state. In this case, based on the lane information (in particular, the lane width and the lateral deviation Dy) detected by the camera sensor 12 and the vehicle body size (in particular, the vehicle body width), the driving support ECU 10 may determine whether or not the side surface of the own vehicle on the lane change direction side has already passed across the boundary white line which is the boundary between the original lane and the target lane to the target lane side (for example, the driving support ECU 10 may determine whether or not a tire of the own vehicle on the lane change side has already passed through the boundary white line).

Example 2 of the Method for Determining of the First Half State or the Second Half State As will be described later, when the approaching vehicle is detected in the first half state of the lane change, the LCA is stopped/terminated in the middle of the LCA and the steering control is performed in such a manner that the own vehicle is made to return to the center position of the original lane in the lane width direction. This steering control is referred to an "LCA cancellation control". Even if the approaching vehicle is detected, and thus, the LCA cancellation control is performed, the own vehicle may enter the target lane, due to response delay in control, delay in the white lines recognition, recognition delay in surrounding monitoring, calculation delay, and the like. Thus, taking the overshoot due to the delay (a delay time from when the approaching vehicle is detected to when the lateral speed of the own vehicle is changed to a lateral speed in the opposite lane change direction) caused by the above factors into consideration, the driving support ECU 10 may switch the lane change progress status from the first half state to the second half state at an earlier timing. That is, the driving support ECU 10 may determine that the lane change progress status has changed to the second half state before the side surface (tire) of the own vehicle passes through the boundary white line. Note that the overshoot means a distance in the lateral direction toward the target lane for which the own vehicle moves.

In this case, the driving support ECU 10 may use a foreseen lateral position Dyf determined in consideration of the above overshoot to determine whether or not the side surface of the own vehicle passes through/across the boundary white line to the target lane side. The overshoot increases as the lateral speed of the own vehicle increases. Thus, the driving support ECU 10 may calculate the foreseen lateral position Dyf using Expression (17) below.

$$Dyf = Dy + vy \cdot Tre \qquad (17)$$

In the Expression (17), Dy is the lateral deviation at the current time point, vy is the lateral speed at the current time point, and Tre is the preset time (called a "foreseen time") for compensating for the response delay.

In this case, a "position deviated in the lateral direction (in the direction for coming closer to the target lane with reference to the center position in the original lane) from the lateral position of the own vehicle which is detected by the camera sensor 12 by the distance (vy·Tre) which is determined according to the lateral speed vy" is regarded/used as the lateral position (foreseen position) of the own vehicle.

The driving support ECU 10 determines whether or not the side surface of the own vehicle determined by this foreseen (prefetching) position passes through/across the boundary white line.

Example 3 of the Method for Determining of the First Half State or the Second Half State The own vehicle is likely to be prevented from entering the target lane if the LCA cancellation control is started when the lateral position of the own vehicle reaches a specific position while the LCA control is being performed. That specific position may be determined in advance and be adopted as the determination position. For example, the determination position may be set to 0.5 m (fixed value). This determination position is a position in the lane change side with respect to the lane center line CL. In this case, unless the position of the center of gravity of the own vehicle laterally moves for a distance longer than 0.5 m from the lane center line CL toward the lane change side (toward the target lane), in other words, when the lateral deviation Dy in the lane change side is 0.5 m or less, the driving support ECU 10 determines that the lane change status is the first half state. When the lateral deviation Dy in the lane change side is longer than 0.5 m, the driving support ECU 10 determines that the lane change status is the second half state. In this example, assuming that the lane width is 3.5 m and the vehicle width of the own vehicle is 1.8 m, when the lateral deviation Dy is 0.5 m, the distance between the center of gravity position of the own vehicle and the boundary white line is 1.25 m (=(3.5/2)−0.5), therefore the distance between the side surface of the own vehicle and the boundary white line is 0.35 m (=1.25−(1.8/2). Therefore, in this example, if the overshoot is 0.35 m or less, the LCA cancellation control can prevent the own vehicle from entering the target lane. When the driving support ECU 10 uses this method for determining of the first half state or the second half state, the determination position is determined depending on the predicted lane width and the predicted overshoot amount.

It should be noted that, regarding the example 2 and example 3 of the method for determining of the first half state or the second half state, the driving support ECU 10 may be said to be configured to determine that the progress status is the first half state when the driving support ECU 10 determines that the own vehicle is located at a position in a direction opposite to the lane change direction with respect to a determination position, and to determine that the progress status is the second half state when the driving support ECU 10 determines that the own vehicle is located at a position in the lane change direction with respect to the determination position, wherein, the determination position is a specific position which is closer to the center position in the original lane than to the boundary between the original lane and the target lane and is closer to the boundary than to the center position in the lane width direction of the original lane.

In the following description, the driving support ECU 10 determines the progress status of the lane change, using the Example 2 or 3 of the method for determining of the first half state or the second half state.

Referring back to FIG. 5, the steering assist control routine will be described. The progress status in the beginning of the LCA is the first half state, and thus, a "No" determination is made at Step S16. In this case, at Step S17, the driving support ECU 10 determines whether or not an other vehicle (other vehicle having a probability of collision with the own vehicle) is present which is likely to approach the own vehicle excessively (too closely) if the own vehicle changes lanes along the target trajectory, based on the surrounding information obtained by the surrounding sensors 11.

For example, the driving support ECU 10 calculates a predicted time (a collision time TTC: Time to Collision) from the current time point to a time point at which any one of other vehicles, which is present either in the original lane or in the lane adjacent to the original lane, would collide with the own vehicle, based on the relative speed between the own vehicle and that other vehicle and a distance between the own vehicle and that other vehicle. The driving support ECU 10 determines whether or not the collision time TTC (minimum TTC if there a plurality of TTCs are predicted) is equal to or longer than a first half state threshold TTC1 to generate a determination result as a surrounding monitoring result. When the collision time TTC is equal to or longer than the first half state threshold TTC1, the surrounding monitoring result is "the approaching vehicle is not present". When the collision time TTC is shorter than the first half state threshold TTC1, the surrounding monitoring result is "the approaching vehicle is present". For example, the first half state threshold TTC1 is set to 4 seconds.

It should be noted that, at Step 17, the driving support ECU 10 may additionally determine whether or not an any other vehicle is present in the lateral direction of the own vehicle to determine that "the approaching vehicle is present" when it is determined that there is an other vehicle in the lateral direction of the own vehicle. Further, at Step 17, the driving support ECU 10 may additionally determine whether or not the own vehicle excessively approaches/comes closer to an any other preceding vehicle travelling in the target lane if the own vehicle changes lanes, based on a distance between that other preceding vehicle and the own vehicle and the relative speed of that other preceding vehicle. In this case, the driving support ECU 10 determines that "the approaching vehicle is present" when it is determined that the own vehicle excessively approaches that other preceding vehicle.

When it is determined that the surrounding monitoring result is "the approaching vehicle is not present" at Step S17 (S17: Yes), the driving support ECU 10 returns the processing to Step S15. When it is determined that the surrounding monitoring result is "the approaching vehicle is present" at Step S17 (S17: No), the driving support ECU 10 advances the processing to Step S30. A case will next be described in which the surrounding monitoring result is "the approaching vehicle is not present".

The driving support ECU 10 repeatedly executes the above-described processes of Steps S15 to S17 every time a predetermined calculation period elapses while the surrounding monitoring result is "the approaching vehicle is not present". As a result, the LCA is continued, and thus, the own vehicle moves toward the target lane.

When it is determined that the lane change progress status has become the second half (S16: Yes) while the processes of Steps S15 to S17 are repeatedly executed, the driving support ECU 10 sets the steering assist control state to the second half LCA state at Step S18. It should be noted that control contents of the LCA itself remains unchanged between the LCA first half state and the LCA second half state, unless the approaching vehicle is detected so that the LCA is stopped. In other words, the subsequent processing after the approaching vehicle is detected so that the LCA is stopped depends on the steering assist control state at the time point at which the LCA is stopped, that is, the LCA first half state or the LCA second half state.

Subsequently, at step S19, the driving support ECU 10 determines whether or not an other vehicle (other vehicle having a probability of collision) is present which is likely to excessively approach the own vehicle if the own vehicle continues changing lanes along the target trajectory, based on the surrounding information obtained by the surrounding sensors 11. In this case, in the same manner as Step S17, the driving support ECU 10 calculates the collision time TTC to determine the presence or absence of the excessively approaching other vehicle (approaching vehicle), using the second half state threshold TTC2 as the determination threshold. That is, when the collision time TTC is equal to or longer than the second half state threshold TTC2, the driving support ECU 10 determines that "the approaching vehicle is not present" When the collision time TTC is shorter than the second half state threshold TTC2, the driving support ECU 10 determines "the approaching vehicle is present". The result of the determination made at step S19 is the surrounding monitoring result.

The second half state threshold TTC2 is set to a value smaller than the first half state threshold TTC1. For example, the second half threshold TTC 2 is set to 2 seconds. Therefore, in the LCA second half state as compared to the LCA first half state, the driving support ECU 10 determines that "the approaching vehicle is present" when the other vehicle whose approach degree has reached a higher level is detected, At Step 19, when the surrounding monitoring result is "the approaching vehicle is not present", the driving support ECU 10 advances the processing to Step S20 to determine whether or not LCA completion condition has been established. In the present embodiment, the LCA completion condition is established, when the lateral position y of the own vehicle reaches the final target lateral position y*. When the LCA completion condition is not established, the driving support ECU 10 returns the processing to Step S15 and repeats the above-described processes of Steps S15 to S20 every time the predetermined calculation period elapses. In this manner, the LCA is continued.

While the LCA is being performed, the target lateral state amount (y*, vy*, and ay*) that varies depending on the elapsed time t are calculated. In addition, based on the calculated target lateral state amount (y*, vy*, and ay*) and the vehicle speed v, the target yaw state amount ($\theta$y*, $\gamma$*, and Cu*) are calculated. Furthermore, based on the calculated target yaw state amount ($\theta$y*, $\gamma$*, and Cu*), the target control amount ($\theta_{lca}$*) is calculated. Every time the target control amount ($\theta_{lca}$*) is calculated, a steering command representing the target control amount ($\theta_{lca}$*) is transmitted to the EPS ECU 20. In this manner, the own vehicle travels along the target trajectory.

It should be noted that, when the travel position of the own vehicle has changed during the LCA from a position in the original lane to a position in the target lane, the lane-related vehicle information (Cu, Dy, and $\theta$y) supplied to the driving support ECU 10 from the camera sensor 12 changes from lane-related vehicle information with respect to the original lane to lane-related vehicle information with respect to the target lane. Thus, when this position change has occurred, it becomes impossible to continue using the target trajectory function y(t) initially calculated when the LCA started as it is. Meanwhile, when the lane in which the own vehicle is present changes, the sign of the lateral deviation Dy reverses. Therefore, when the driving support ECU 10 detects that the sign (plus or minus) of the lateral deviation Dy output by the camera sensor 12 has changed, the driving support ECU 10 offsets/shifts the target trajectory function y(t) by the lane width W of the original lane. This enables the target trajectory function y(t) calculated using the lane center line CL of the original lane as an origin to be converted into the target trajectory function y(t) which uses the lane center line CL of the target lane as an origin.

When it is determined at Step S20 that the LCA completion condition is established, the driving support ECU 10 sets the steering assist control state to an LTA ON state at Step S21. In other words, the driving support ECU 10 completes the LCA and restarts the LTA. As a result, the steering control is performed in such a manner that the own vehicle travels along the lane center line CL of the target lane. After the steering assist control state is set to the LTA ON state at Step S21, the driving support ECU 10 returns the processing to Step S11, and continues executing the steering assist control routine described above.

When the LCA is completed and the steering assist control state is set to the LTA ON state, the screen displayed on the display unit 31 is switched to the LTA screen 31a from the LCA screen 31b, as illustrated in FIG. 8.

During the period from the start of the LCA to the termination of the steering assist control routine, the driving support ECU 10 transmits to the meter ECU 30 a flashing command of the turn signal 32 of the turn signal operation direction. The turn signal 32 intermittently flashes based on a flashing command transmitted from the steering ECU 40 owing to an operation for the turn signal lever 41 to the first stroke position P1L (P1R) from a time point before the LCA is started. The meter ECU 30 continues having the turn signal 32 intermittently flashing as long as the flashing command is being transmitted from the driving support ECU 10, even when and after the flashing command transmitted from the steering ECU 40 is stopped.

Figure 6:
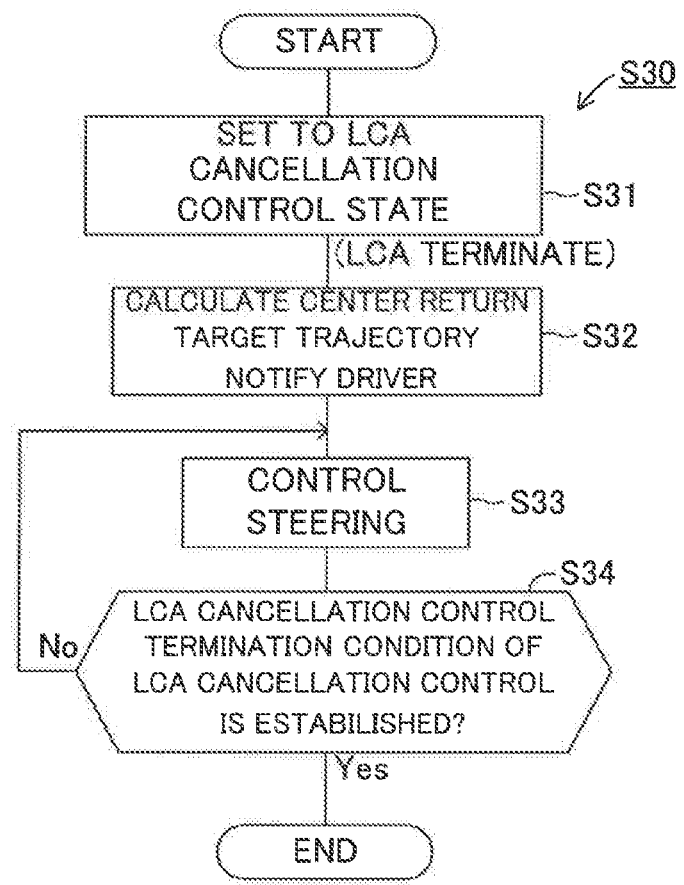
FIG. 6 is a flowchart for illustrating an LCA cancellation control routine.

Next, a case where the surrounding monitoring result indicates "the approaching vehicle is present" in the LCA first half state at Step S17 will be described. In the LCA first half state, when the surrounding monitoring result is "the approaching vehicle is present", the driving support ECU 10 advances the processing to Step 30 to perform the LCA cancellation control. FIG. 6 is a flowchart for illustrating the LCA cancellation control routine which specifically describes the processing of Step S30.

In the LCA first half state, the own vehicle is present in the original lane. Therefore, unless the own vehicle is made to enter the target lane, the own vehicle does not approach the other vehicle (approaching vehicle) abnormally. Therefore, in the LCA cancellation control routine, the following processing is executed in such a manner that the own vehicle is prevented from entering the target lane.

First, at Step S31, the driving support ECU 10 sets the steering assist control state to the LCA cancellation control state. When the steering assist control state is set to the LCA cancellation control state, the LCA is terminated/stopped.

Subsequently, at Step S32, the driving support ECU 10 calculates the target trajectory to have the own vehicle move from the current position (the position of the own vehicle at the moment when the LCA cancellation control state is set) to the center position in the lane width direction of the original lane (hereinafter simply referred to as a "center position"). Hereinafter, this target trajectory is referred to as a "center return target trajectory". The function y(t) shown in the Expression (2) is also used for the center return target trajectory. The function representing the center return target trajectory is referred to as a "center return target trajectory function y(t)". In order to determine the coefficients c0, c1, c2, c3, c4, and c5 of the function y(t) shown in Expression (2) for the center return target trajectory function y(t), center return target trajectory calculation parameters are set as follows. The center return target trajectory calculation parameters include the following seven parameters (P11 to P17).

P11: a lateral position of the own vehicle at the current time point (a time point at which the steering assist control state is set to the LCA cancellation control state).

P12: a lateral speed of the own vehicle at the current time point (a time point at which the steering assist control state is set to the LCA cancellation control state).

P13: a lateral acceleration of the own vehicle at the current time point (a time point at which the steering assist control state is set to the LCA cancellation control state).

P14: a target lateral position which is a target value of a lateral position to which the own vehicle is to be (finally) moved (in this example, the target lateral position is the center position of the original lane, and hereinafter referred to as a "center return completion target lateral position)".

P15: a target lateral speed of the own vehicle (referred to as a "center return complete target lateral speed") when the own vehicle reaches the center return completion target lateral position.

P16: a target lateral acceleration of the own vehicle (referred to as a "center return complete target lateral acceleration") when the own vehicle is reaches the center return completion target lateral position.

P17: a target time (referred to as a "center return target time") which is a target value of the time required to move the own vehicle from the current position to the center return completion target lateral position.

Here, for example, the lateral position of the own vehicle at the current time point (the time point at which the LCA cancellation control state is set) is expressed as $y_{cancel}$, the lateral speed at the current time point is expressed as $vy_{cancel}$, the lateral acceleration at the current time point is expressed as $ay_{cancel}$, the time at which the steering assist control state is set to the LCA cancellation control state is se to 0 (t=0), and the center return target time is expressed as $t_{cancel}$. In this case, the center return target trajectory calculation parameters are set as follows: $y(0)=y_{cancel}$, $y'(0)=vy_{cancel}$, $y''(0)=ay_{cancel}$, $y(t_{cancel})=0$, $y'(t_{cancel})=0$, and $y''(t_{cancel})=0$.

The lateral position $y_{cancel}$, the lateral speed $vy_{cancel}$, and the lateral acceleration $ay_{cancel}$ are calculated/determined in the same manner as the method for obtaining the initial lateral state amount described above based on values detected at the current time point. That is, the lateral position $y_{cancel}$ is the lateral deviation Dy at the current time point. The lateral speed $vy_{cancel}$ is obtained from the vehicle speed v at the current time point and the yaw angle θy at the current time point ($vy_{cancel}=v\cdot\sin(\theta y)$). The lateral acceleration $ay_{cancel}$ is a value ($v\cdot\gamma$) obtained by multiplying the yaw rate γ at the current time point by the vehicle speed v at the current time point. Further, $y(t_{cancel})$ is the center return completion target lateral position, and is set to the center position of the original lane. $y'(t_{cancel})$ represents the center return completion target lateral speed, and $y''(t_{cancel})$ represents the center return completion target lateral acceleration, both of which are set to zero.

Further, the center return target time $t_{cancel}$ is calculated using a target time setting constant $A_{cancel}$ according to Expression (18) below. The target time setting constant $A_{cancel}$ is set to a value approximately equal to the target time setting constant A used when the target lane changing time $t_{len}$ is calculated at the LCA start time point.

$$t_{cancel}=D_{cancel}\cdot A_{cancel} \quad (18)$$

Here, $D_{cancel}$ is a required distance which is a distance for which the own vehicle is required to be moved in the lateral direction from the lateral position of the own vehicle when the steering assist control state is set to the LCA cancellation control state to the center return completion target lateral position (the center position of the original lane). In the LCA cancellation control state, since the own vehicle is present in the original lane, it is not necessary for the own vehicle to be moved urgently/quickly through the LCA cancellation control. Therefore, the speed of moving the own vehicle in the lateral direction in the LCA cancellation control may be comparable with the speed of moving the own vehicle in the lateral direction in the LCA. Thus, the target time setting constant $A_{cancel}$ is set to a value approximately equal to the target time setting constant A used when the LCA is performed.

Based on the set values of the center return target trajectory calculation parameters, the driving support ECU 10 calculates the values of the coefficients c0, c1, c2, c3, c4, and c5 of the function y (t) shown in the Expression (2), in the same manner as Step S14. Thereafter, the driving support ECU 10 finalizes/fixes the target trajectory function y(t) through substituting the values of the calculated coefficients $c_0$, $c_1$, $c_2$, $c_3$, $c_4$, and $c_5$ into the Expression (2).

Figure 11:
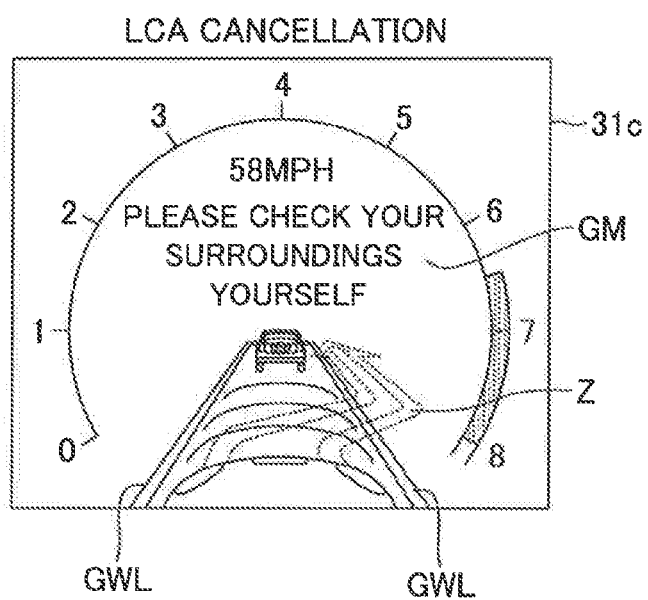
FIG. 11 is a diagram for illustrating an LCA cancellation screen of a display unit.

At Step S32, the driving support ECU 10 not only finalizes/fixes the center return target trajectory function but also, at the same time, notifies the driver that the LCA is canceled (or is terminated in the middle of the LCA). For example, the driving support ECU 10 drives the buzzer 13 to generate a notification sound (for example, a sound "beep") and transmits an LCA cancellation notification command to the meter ECU 30. The meter ECU 30 receives the LCA cancel notification command to display an LCA cancellation screen 31c on the display unit 31, as shown in FIG. 11. On the LCA cancellation screen 31c, the LCA trajectory Z (refer to FIG. 8) which has been displayed brightly until the LCA cancel notification command is received is darkened or erased. As a result, the driver recognizes that the LCA is stopped/terminated. The LCA cancellation screen 31c is displayed until the LCA cancellation control state ends.

Subsequently, at Step S33, the driving support ECU 10 performs the steering control based on the center return target trajectory function y (t) which was fixed/finalized at the previous Step S32. In this case, the driving support ECU 10 resets the clock timer t (i.e., clears the clock timer t to 0, and thereafter, activates/starts the clock timer) to calculate the target lateral movement state amount (y*, vy*, ay*) and the target yaw state amount (θy*, γ*, Cu*), in the same manner as Step S15, based on the elapsed time t from the time point at which the steering assist control state is set to the LCA cancellation control state, and the center return target trajectory function y(t), to thereby calculate the final target steering angle $\theta_{cancel}^*$. For example, the target steering angle $\theta_{cancel}^*$ can be calculated in the same manner as θlca* by replacing the left-hand side of the Expression (15) with the target steering angle $\theta_{cancel}^*$.

After the target control amount (the target steering angle $\theta_{cancel}^*$) is calculated, the driving support ECU 10 transmits the steering command representing the target control amount to the EPS ECU 20. In this embodiment, the driving support ECU 10 calculates the target steering angle $\theta_{cancel}^*$ as the target control amount, but the driving support ECU 10 may calculate a target torque for obtaining the target steering angle A $\theta_{cancel}^*$, and transmit a steering command representing that target torque to the EPS ECU 20.

Next, at Step S34, the driving support ECU 10 determines whether or not a termination condition of the LCA cancellation control state has been established. In this case, the driving support ECU 10 determines that the termination condition of the LCA cancellation control state has been established, when the driving support ECU 10 has detected that the lateral position of the own vehicle has reached the center return completion target lateral position (the center position of the original lane) owing to the steering control described above. Alternatively, the driving support ECU 10 may determine that the termination condition of the LCA cancellation control state has been established, when the driving support ECU 10 has detected that the LCA cancellation control state has been continued for a certain time (which is, for example, the center return target time $t_{cancel}$ or a time longer than the center return target time $t_{cancel}$ by a predetermined time) set in advance.

When the driving support ECU 10 has determined that the termination condition of the LCA cancellation control state has not been established (S34: No), the driving support ECU 10 returns the processing to Step S33. Therefore, the steering control is performed until the termination condition of the LCA cancellation control state becomes established. As a result, the own vehicle continues moving toward the center position of the original lane.

When the termination condition of the LCA cancellation control state has been established through repeating the processes described above, the driving support ECU 10 terminates the LCA cancellation control routine and advances the processing to Step S21 of the main routine (the steering assist control routine). As a result, the steering assist control state is switched from the LCA cancellation control state to the LTA ON state. The functional unit of the driving support ECU 10 which performs the LCA cancellation control routine corresponds to the center return assist control means of the present invention.

Figure 14:
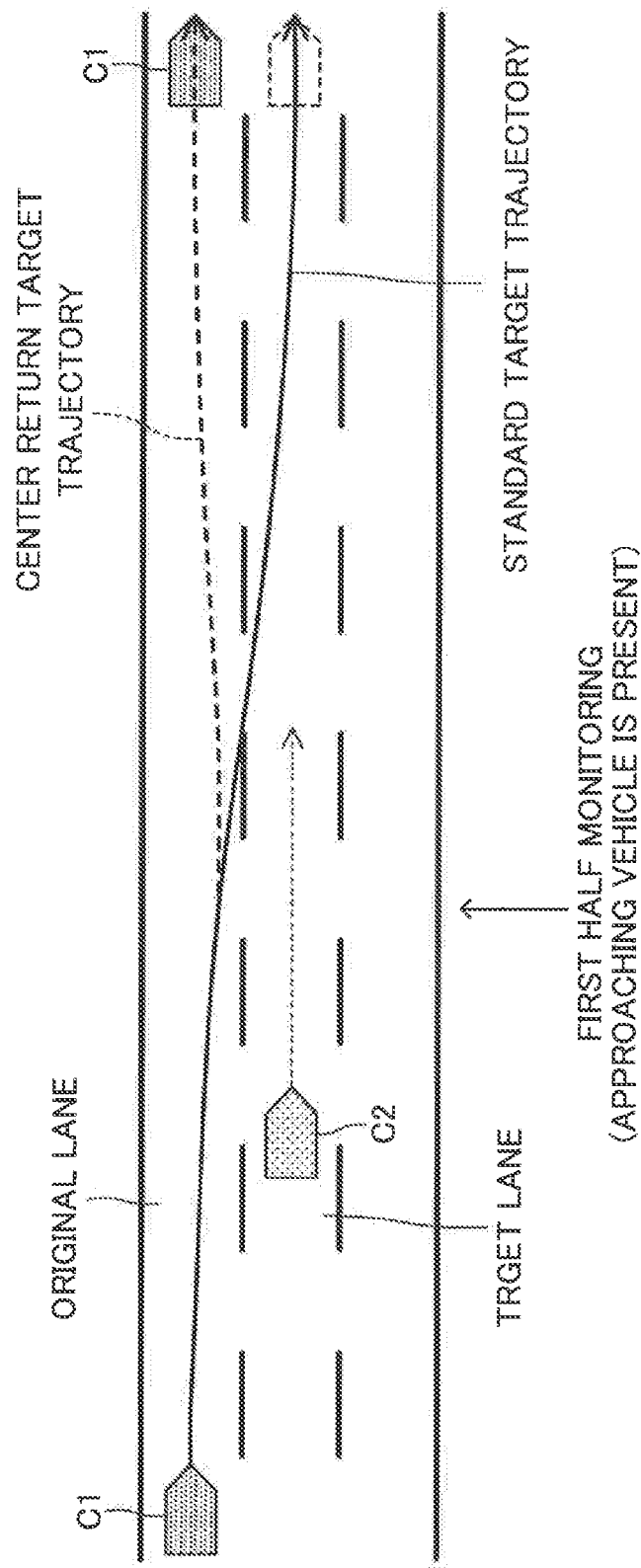
FIG. 14 is a diagram for illustrating the target trajectory and a center return target trajectory.

FIG. 14 illustrates the center return target trajectory when the own vehicle C1 and the other vehicle C2 traveling on the target lane approach (comes closer to) each other in the LCA first half state.

Figure 7:
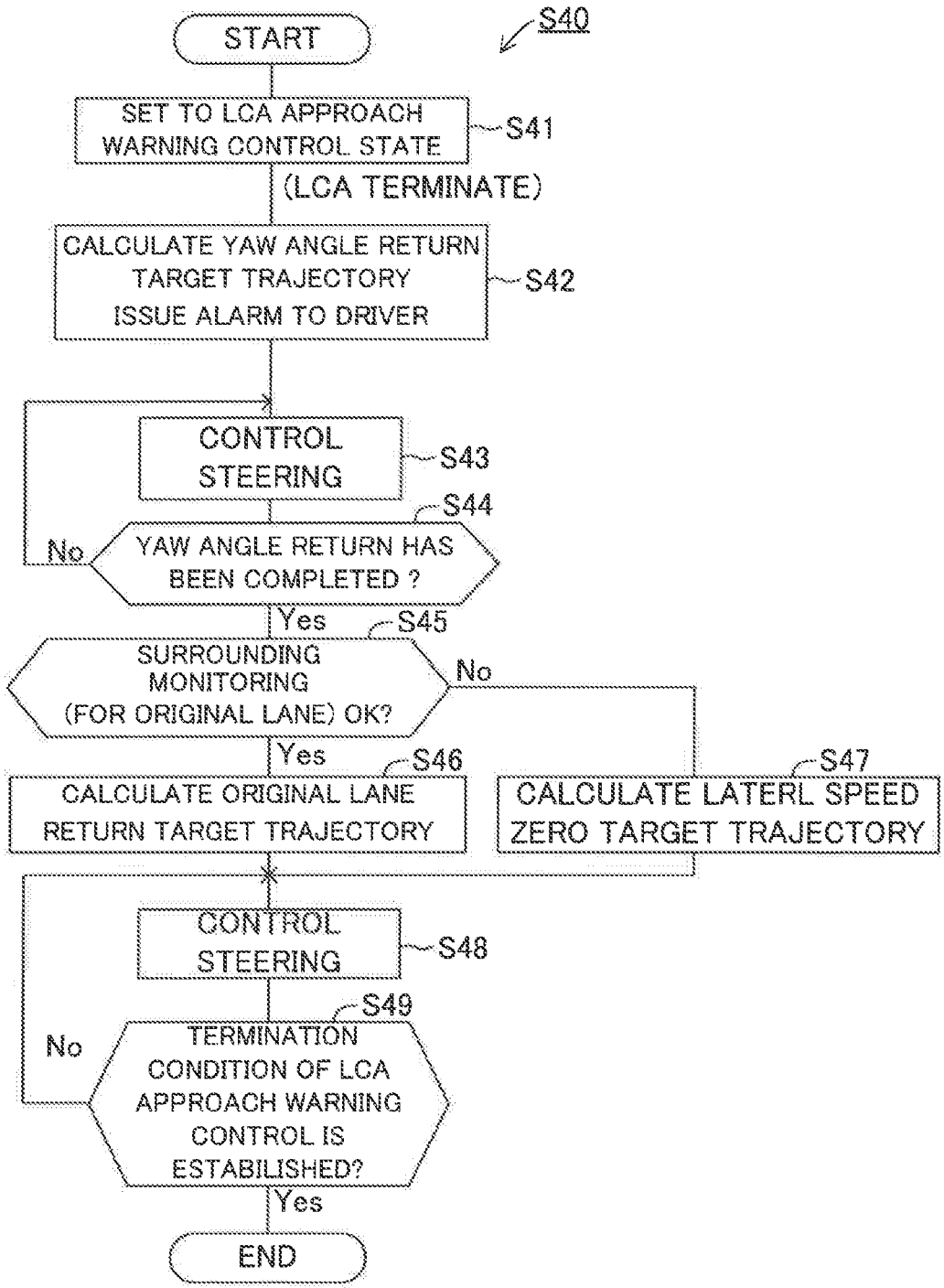
FIG. 7 is a flowchart for illustrating an LCA approach warning control routine.

Next, a case will next be described in which the surrounding monitoring result is "the approaching vehicle is present" (S19: No) in the LCA second half state. When the surrounding monitoring result starts to indicate that "the approaching vehicle is present", the driving support ECU 10 advances the processing to Step S40 to execute an LCA approach warning/alert control. FIG. 7 is a flowchart for illustrating the LCA approach warning/alert control routine which more specifically shows the processing of Step S40.

Figure 17:
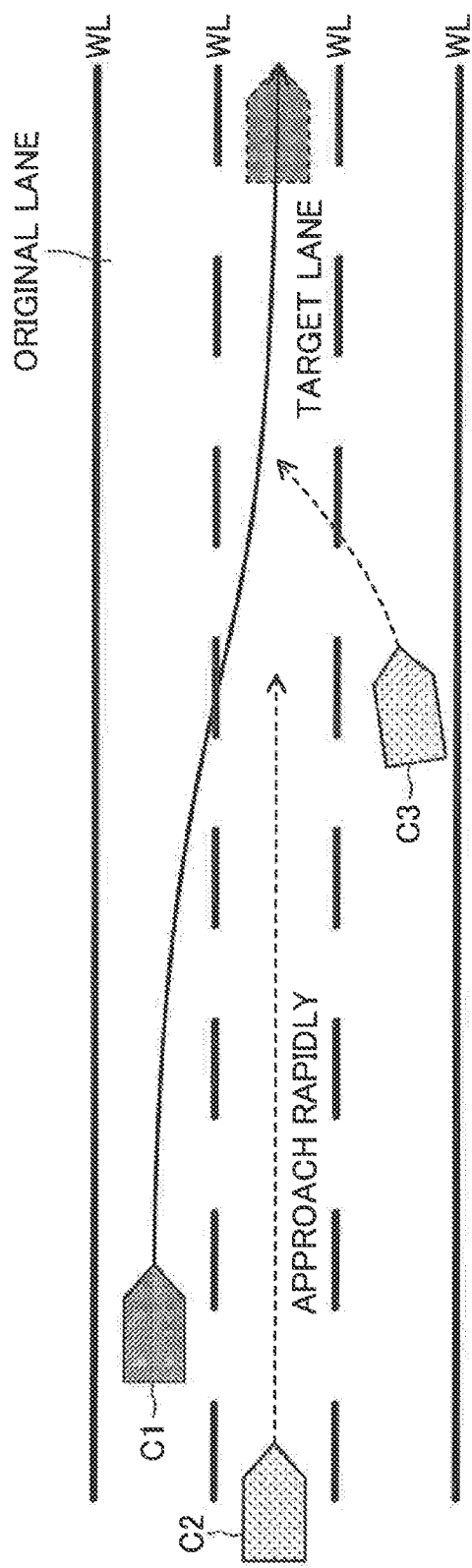
FIG. 17 is a diagram for illustrating an approaching state between an own vehicle and other vehicles.

When the surrounding monitoring result in the LCA first half state is "the approaching vehicle is not present", no approaching vehicle is usually detected in the LCA second half state. However, as illustrated in FIG. 17, there are some cases to be considered when the LCA being performed. For example, a case may occur where the other vehicle C2 in the target lane approaches the own vehicle C1 rapidly with an unexpectedly large relative speed from behind of the own vehicle C1. Further, for example, a case may occur where the other vehicle C3 enters the target lane from a lane next to the target lane (a lane which is two lanes away from the original lane) and excessively approaches the own vehicle C1. Further, a case may occur where an other vehicle which has been in the blind spot range of the surrounding sensors 11 approaches the own vehicle excessively.

Therefore, in the LCA approach warning control of Step S40, an alarm is generated to the driver and the movement of the own vehicle is changed in a short time in such a manner that the own vehicle does not move to the center side in the width direction of the target lane, thereby the processing for assisting collision avoidance with the other vehicle is executed.

When the LCA approach warning control routine of Step S40 is started, the driving support ECU 10 sets the steering assist control state to the LCA approach warning control state at Step S41. When the steering assist control state is set to the LCA approach warning control state, the LCA is terminated.

Subsequently, at Step S42, the driving support ECU 10 calculates a yaw angle return target trajectory to return the yaw angle of the own vehicle to the yaw angle (in the state) immediately before when the LCA was started.

Here, the yaw angle return target trajectory will be described. The yaw angle return target trajectory represents a target trajectory for changing the yaw angle of the own vehicle to zero for/in as short a time as possible as long as a traveling stability of the own vehicle is lost/worsened. In other words, the yaw angle return target trajectory represents a target trajectory for changing the lateral speed of the own vehicle in the lane change direction to zero for/in as short a time as possible as long as the traveling stability of the own vehicle is lost/worsened. The yaw angle when the LCA is started is estimated to be a value close to zero, because the LTA is performed immediately before the LCA is started. In view of the above, the driving support ECU 10 calculates the yaw angle return target trajectory which nullifies the target lateral speed vy* calculated from the LCA target trajectory function (i.e., which makes the target lateral speed vy* zero) through returning the yaw angle which has been generated by the LCA to the yaw angle (in the state) immediately before the start of the LCA.

The above described target trajectory during the LCA defines/represents the target lateral position with respect to a time elapsed from the start of the LCA, whereas, the yaw angle return target trajectory defines/represents a target curvature with respect to a time elapsed from the time point at which the approaching vehicle has been detected in the LCA second half state. The target control amount which is finally output/transmitted to the EPS ECU 20 when the yaw angle return target trajectory is used is set to a value obtained by multiplying a sum of the target curvature and the curvature (curvature of the lane) detected by the camera sensor 12 by a control gain which is a coefficient for converting an arbitrary curvature into a steering angle (which may be the above-mentioned control gain $K_{lca}1$).

A method of returning the yaw angle to the yaw angle (state) immediately before the start of the LCA is further described. The target control amount in the LCA is expressed as (represented by) the target steering angle $\theta_{lca}^*$. This target steering angle $\theta_{lca}^*$ includes, as shown by the Expression (15), the feed-forward control term ($K_{lca}1 \cdot Cu^*$) calculated from the target curvature Cu*.

The change in the target curvature corresponds to a change in the steering angle, and can be grasped as a change in the yaw angle. Therefore, when the approaching vehicle is detected in the LCA second half state, the driving support ECU 10 calculates an integral value of the target curvature Cu* in a period from the start of the LCA to a time point at which the approaching vehicle is detected to output/transmit to the EPS ECU 20 a control amount which has a magnitude corresponding to a magnitude of the integral value of the target curvature Cu* and has a reversed sign of the integral value of the target curvature Cu*, to thereby be able to return the yaw angle to the yaw angle (the state) immediately before the start of the LCA.

Figure 12:
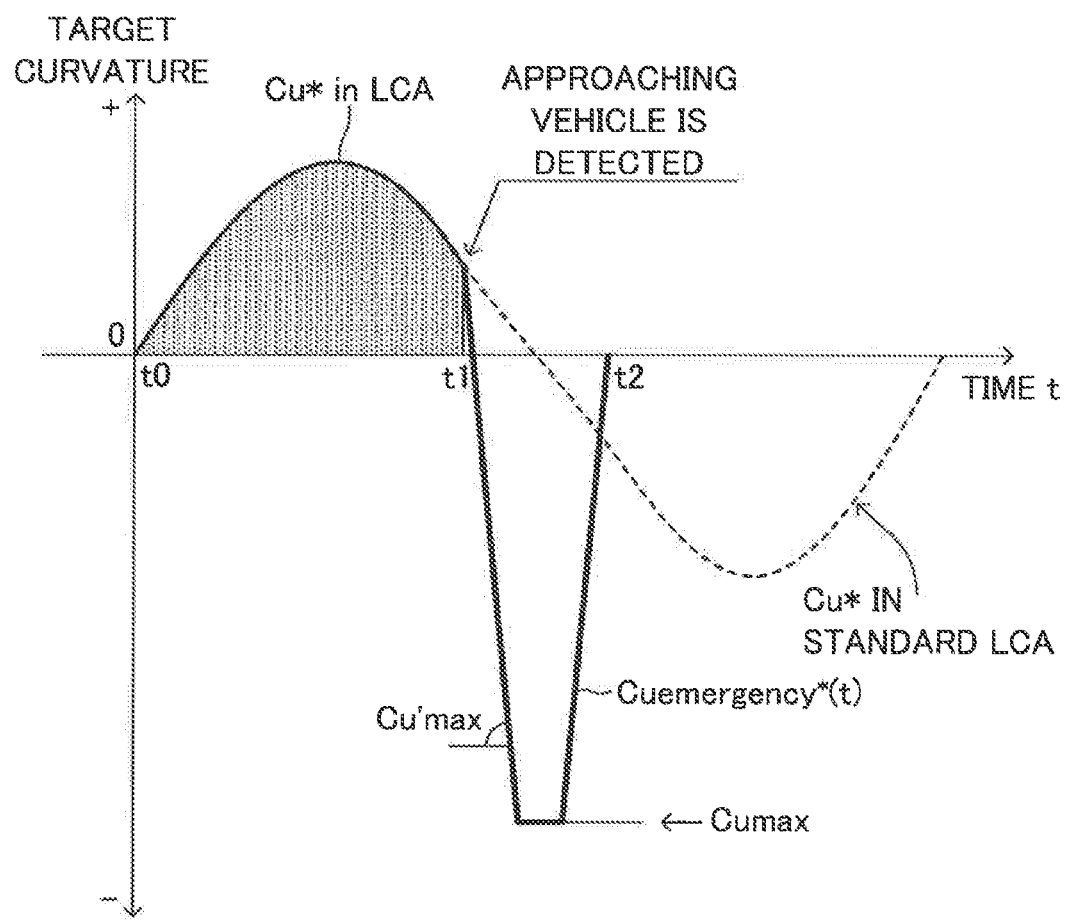
FIG. 12 is a graph for illustrating a graph of target curvature.

For example, as shown in FIG. 12, when the approaching vehicle has been detected at a time t1, the integral value of the target curvature Cu* for a period from a time t0 at which the LCA starts to the time t1 corresponds to an area of the portion colored in gray. Therefore, when the feed-forward control amount having a magnitude of a value corresponding to that area and having a reversed sign of that value (i.e., after the left-right direction is reversed) is transmitted as the command to the EPS ECU 20, the yaw angle can be returned to the yaw angle (in the state) immediately before the start of the LCA at a time point when outputting the feed-forward control amount is completed. The value obtained by reversing the sign (plus or minus) of the integral value of the target curvature Cu* in the period from the time t0 to the time t1 is referred to as a "reversed sign integral value". The integral value of the target curvature Cu* from the start of the LCA can be made to become zero through adding the reversed sign integral value to the integral value of the target curvature Cu* in the period from the time t0 to the time t1.

When the approaching vehicle (the other vehicle which is predicted to excessively approach the own vehicle in the target lane) has been detected in the LCA second half state, the part of the own vehicle is high likely to be within the target lane. Thus, when this happens, it is necessary for the own vehicle to be moved urgently/quickly (i.e., an emergency situation is occurring). Therefore, the yaw angle should be returned to zero for as short a time as possible so that (the traveling direction of) the own vehicle is caused to become parallel to (a formation direction of) the lane. On the other hand, (the control system in) the steering assist device has an upper limit value of the magnitude of the lateral acceleration of the vehicle (lateral acceleration generated in the vehicle and different from the lateral acceleration in the lane width direction) and an upper limit value of the magnitude of a change rate when changing the lateral acceleration (magnitude of a change amount in the lateral acceleration per unit time).

Therefore, as indicated by the thick solid line in FIG. 12, the driving support ECU 10 calculates the target curvature $Cu_{emergency}^*$ after the time t1. The target curvature $Cu_{emergency}^*$ is calculated using a maximum value ($Cu_{max}$) and a maximum change gradient ($Cu'_{max}$). The maximum value ($Cu_{max}$) is set to a value corresponding to the upper limit value of the magnitude of the lateral acceleration of the vehicle which is a maximum value among absolute values of the lateral acceleration of the vehicle that are allowed to be generated by the control system of the steering assist device. Further, the maximum change gradient ($Cu'_{max}$) represents a change gradient (rate) at which (the magnitude of) the target curvature $Cu_{emergency}^*$ is increased toward the maximum value $Cu_{max}$ and a change gradient (rate) at which (the magnitude of) the target curvature $Cu_{emergency}^*$ is decreased from the maximum value $Cu_{max}$ toward zero. The maximum change gradient ($Cu'_{max}$) is set to a value corresponding to the upper limit value of the change rate of the lateral acceleration which is a maximum value among absolute values of the change rate of the lateral acceleration that are allowed to be generated by the control system of the steering assist device. For example, the maximum value $Cu_{max}$ is set to a value when the lateral acceleration of the vehicle is 0.2 G (G: gravitational acceleration). The lateral acceleration YG generated in the vehicle can be calculated as a value obtained by multiplying the square value ($v^2$) of the vehicle speed by the curvature (Cu) (YG=$v^2 \cdot$Cu). Thus, the maximum value $Cu_{max}$ can be obtained based on this relational expression. It should be noted that the signs of the maximum value $Cu_{max}$ and the maximum change gradient $Cu'_{max}$ are determined based on the sign of the reversed sign integral value.

The driving support ECU 10 calculates, based on the magnitude of the reversed sign integral value, the maximum value $Cu_{max}$ of the target curvature, and the maximum change gradient $Cu'_{max}$ of the target curvature, the target curvature $Cu_{emergency}^*$ with respect to the elapsed time t from the time point (time t1 in FIG. 12) at which the approaching vehicle is detected. Hereinafter, the target curvature $Cu_{emergency}^*$ with respect to the elapsed time t is expressed as a "target curvature function $Cu_{emergency}^*(t)$". The target curvature function $Cu_{emergency}^*(t)$ determines/defines the target trajectory of the own vehicle. Therefore, this target curvature function $Cu_{emergency}^*(t)$ corresponds to the yaw angle return target trajectory.

The reversed sign integral value may be calculated by integrating (a magnitude of) the value of the target curvature Cu* and reversing the sign of the obtained integral value every time the target curvature Cu* is calculated while the LCA is being performed. However, in this embodiment, the reversed sign integral value is calculated as follows.

The target curvature Cu* while the LCA is being performed can be expressed according to Expression (19) using the target lateral acceleration ay* and the vehicle speed v.

$$Cu^* = ay^*/v^2 \qquad (19)$$

Therefore, the value obtained by integrating this target curvature Cu* from the time t0 (elapsed time t=0) to the time t1 (elapsed time t=t1) can be expressed as Expression (20) using the vehicle speed v and the target lateral speed vy*. The Expression (20) is based on the assumption that the vehicle speed v can be assumed to be unchanged while the LCA is being performed.

$$\int_0^{t1} Cu^*(t)dt = \left[\frac{vy^*(t)}{v^2}\right]_0^{t1} \qquad (20)$$
$$= \frac{vy^*(t1)}{v^2}$$

The reversed sign integral value is obtained by reversing the sign of the integral value calculated according to the Expression (20). As described above, the target curvature $Cu_{emergency}^*$ with respect to (for) the elapsed time t after the time point when the approaching vehicle was detected can be calculated, based on the magnitude of the thus calculated reversed sign integral value, the maximum value $Cu_{max}$ of the target curvature, and the maximum change gradient $Cu'_{max}$ of the target curvature. In this manner, under the limitation of the maximum value $Cu_{max}$ and the maximum change gradient $Cu'_{max}$, the driving support ECU 10 calculates the target curvature $Cu_{emergency}^*$ which returns the integrated value of the target curvature Cu* from the start of the LCA to zero in the shortest time (as early as possible). For example, the target curvature $Cu_{emergency}^*$ is varied at the magnitude of the maximum change gradient $Cu'_{max}$ to a value having a magnitude of the maximum value $Cu_{max}$ from the value at the time point t1, is kept at the value having the magnitude of the maximum value $Cu_{max}$ for a certain time, and the is varied from the value having the magnitude of the maximum value $Cu_{max}$ to zero at the time point t2 in such a manner that an area of a trapezoid formed by the thick solid line and the abscissa axis shown in FIG. 12.

The method for the calculation of the yaw angle return target trajectory (the target curvature function $Cu_{emergency}^*(t)$) has been described above.

At Step S42, simultaneously with the calculation of the yaw angle return target trajectory, the driving support ECU 10 gives an alarm to the drive in order to notify that the LCA has been terminated halfway (in the middle of the LCA) and the approaching vehicle has been detected. For example, the driving support ECU 10 drives the buzzer 13 to generate an alarm sound (for example, a sound "beeps") and transmits an LCA approach warning command to the meter ECU 30. This alarm sound is generated in a mode with the highest attention arousing level.

Figure 13:
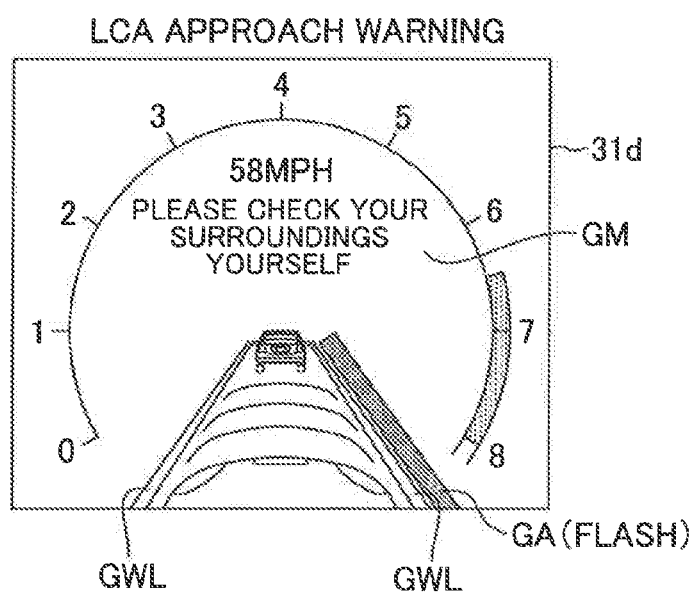
FIG. 13 is a diagram for illustrating an LCA approach warning screen of a display unit.

The meter ECU 30 receives the LCA approach warning command to display the LCA approach warning screen 31d on the display unit 31, as illustrated in FIG. 13. In the LCA approach warning screen 31d, the LCA trajectory Z (refer to FIG. 8) is erased, which has been displayed until the meter ECU 30 receives the LCA approach warning command, and a warning image GA is displayed in a blinking manner in parallel to the white line display GWL beside the white line display GWL on the lane change direction side (right side in this example). Sounding the buzzer 13 and the LCA approach warning screen 31d displayed on the display unit 31 enable the driver to recognize that the LCA has been terminated halfway and the other vehicle is excessively approaching the own vehicle in the target lane.

Subsequently, at Step S43 of the routine shown in FIG. 7, the driving support ECU 10 performs the steering control based on the target curvature function $Cu_{emergency}^*(t)$ calculated at the previous Step S42. In this case, the driving support ECU clock timer t (clear the clock timer t to zero and starts the clock timer) to calculate the target curvature $Cu_{emergency}^*$ at the current time based on the elapsed time t from the time point at which the approaching vehicle was detected in the LCA second half state and the target curvature function $Cu_{emergency}^*(t)$. The driving support ECU 10 calculates the target steering angle $\theta_{emergency}^*$ at the current time point based on the target curvature $Cu_{emergency}^*$ at the current time point and the curvature Cu detected by the camera sensor 12 at the current time point. As shown in the following Expression (21), the target steering angle $\theta_{emergency}^*$ is calculated by multiplying a sum of the target curvature $Cu_{emergency}^*$ at the current time point and the curvature Cu detected by the camera sensor 12 at the current time point by the control gain Klca1.

$$\theta_{emergency}^* = Klca1 \cdot (CU_{emergency}^* + Cu) \quad (21)$$

The driving support ECU 10 transmits a steering command representing the target steering angle $\theta_{emergency}^*$ to the EPS ECU 20 every time the target steering angle $\theta_{emergency}^*$ is calculated. When the EPS ECU 20 receives the steering command, the EPS ECU 20 drives the steering motor 22 so that the steering angle follows the target steering angle $\theta_{emergency}^*$. In this embodiment, the driving support ECU 10 calculates the target steering angle $\theta_{emergency}^*$ as the target control amount, but the driving support ECU 10 may calculate a target torque for obtaining the target steering angle $\theta_{emergency}^*$, and transmit a steering command representing that target torque to the EPS ECU 20.

Hereinafter, the steering control using the target steering angle $\theta_{emergency}^*$ is referred to as a "yaw angle return control". Owing to the yaw angle return control, the steering angle is controlled based only on a feedforward control term which is obtained using the sum of the target curvature $Cu_{emergency}^*$ and the curvature Cu detected by the camera sensor 12. In other words, feedback control using the yaw angle $\theta y$ detected by the camera sensor 12 is not performed.

The driving support ECU 10 may store the values of the feedback control amounts (the second to fifth terms on the right-hand side of the Expression (15)) calculated at a time point immediately before the time point (time t1) at which the approaching vehicle was detected, and may add those stored values (fixed values) to the right-hand side of the Expression (21) as a part of the feed-forward control amounts when performing the yaw angle return control.

Next, at Step S44, the driving support ECU 10 determines whether or not the yaw angle return control has been completed. The yaw angle return control is completed at a time point (time t2 in FIG. 12) at which the target curvature $Cu_{emergency}^*$ becomes zero. When the yaw angle return control has not been completed, the driving support ECU 10 returns the processing to Step S43 to execute the same processing. Such processes are repeated every time a predetermined calculation period elapses so that the yaw angle is rapidly decreased (at a high rate).

The magnitude of the yaw angle also changes while the own vehicle is being returned to the center position in the original lane by the LCA cancellation control. While the yaw angle return control is being performed, the magnitude of the yaw angle decreases at a rate (that is, the emergency rate) higher than the change rate while the LCA cancellation control is being performed (refer to the maximum value $Cu_{max}$ of the target curvature and the maximum change gradient $Cu'_{max}$ as described above).

When the yaw angle return control has been completed (S44: Yes), the driving support ECU 10 advances the processing to Step S45. The yaw angle has been decreased to almost zero by this time point. That is, the lateral speed of the own vehicle is almost zero at this time point. Therefore, the own vehicle is prevented from moving to the center line in the width direction of the target lane. In this manner, it is possible to avoid the collision with the approaching vehicle. The functional unit of the driving support ECU 10 that executes the yaw angle return control (S42 to S44) corresponds to a collision avoidance assist control means of the present invention.

In Step S45, the driving support ECU 10 determines whether or not there is a space for safely returning the own vehicle to the original lane based on the surrounding information obtained by the surrounding sensors 11. For example, the driving support ECU 10 determines whether or not yet further another vehicle is present in the original lane based on the surrounding information, when the other vehicle is present, the driving support ECU 10 calculates the collision time TTC between the own vehicle and the other vehicle to determine whether or not the other vehicle which approaches the own vehicle abnormally is present. In this case, the return threshold TTC3 is used as the determination threshold. That is, when the collision time TTC of the other vehicle traveling in the original lane is equal to or more than the return threshold TTC3, the driving support ECU 10 determines that the surrounding monitoring result is "the approaching vehicle is not present", when the collision time TTC is less than the return threshold TTC3, the driving support ECU 10 determines that the surrounding monitoring result is "the approaching vehicle is present". The return threshold TTC3 is set to a value approximately equal to the first half threshold TTC1 (accordingly, larger than the second half threshold TTC2).

When the surrounding monitoring result is "the approaching vehicle is not present", the driving support ECU 10 advances the processing to Step S46, when the surrounding monitoring result is "the approaching vehicle is present", the driving support ECU 10 advances the processing to Step S47.

First, a case where the surrounding monitoring result of the original lane is "the approaching vehicle is not present" will be described.

At Step S46, the driving support ECU 10 calculates a target trajectory for moving the own vehicle from the current position (the position of the own vehicle at the time point at which the yaw angle return control is completed) to the center position of the original lane. Hereinafter, this target trajectory is referred to as an "original lane return target trajectory". For this original lane return target trajectory, the function y(t) shown in the Expression (2) is also used. The function representing the original lane return target trajectory is called an "original lane return target trajectory function y(t)". In order to finalize/determine the original lane return target trajectory function y(t), the original lane return target trajectory calculation parameters are set as follows to determine the coefficients c0, c1, c2, c3, c4, and c5 of the function y(t) shown in the Expression (2). The original lane return target trajectory calculation parameters are the following seven parameters (P21 to P27).

P21: a lateral position of the own vehicle at the current time point (a time point at which the yaw angle return control is completed).

P22: a lateral speed of the own vehicle at the current time point (a time point at which the yaw angle return control is completed).

P23: a lateral acceleration of the own vehicle at the current time point (a time point at which the yaw angle return control is completed).

P24: a target lateral position which is a target value of a lateral position to which the own vehicle is to be (finally) moved (in this example, the target lateral position is the center position of the original lane, and hereinafter, is referred to as an "original lane return completion target lateral position").

P25: a target lateral speed of the own vehicle (referred to as an "original lane return completion target lateral speed") when the own vehicle reaches the original lane return completion target lateral position.

P26: a target lateral acceleration of the own vehicle (referred to as an "original lane return completion target lateral acceleration") when the own vehicle reaches the original lane return completion target lateral position.

P27: a target time (referred to as an "original lane return target time") which is a target value of the time required to move the own vehicle from the current position to the original lane return completion target lateral position.

Here, the lateral position of the own vehicle at the current time point (at the time when the yaw angle return control is completed) is expressed as $y_{return}$, the lateral speed of the own vehicle at the current time point is expressed as $vy_{return}$, the lateral acceleration at the current time point is expressed as $ay_{return}$, the time at which the yaw angle return control is completed is se to 0 (t=0), and the original lane return target time is expressed as $t_{return}$. The original lane return target trajectory calculation parameters are set as follows: $y(0)=y_{return}$, $y'(0)=vy_{return}$, $y''(0)=ay_{return}$, $y(t_{return})=W$ (sign is set according to the lane change direction), $y'(t_{return})=0$, and $y''(t_{return})=0$.

The lateral position $y_{return}$, the lateral speed $vy_{return}$, and the lateral acceleration $ay_{return}$ are calculated/determined in the same manner as the method for obtaining the initial lateral state amount described above based on values detected at the current time point. That is, the lateral position $y_{return}$ is the lateral deviation Dy at the current time point. The lateral speed $vy_{return}$ is obtained from the vehicle speed at the current time point and the yaw angle θy at the current time point ($vy_{return}=v\cdot\sin(\theta y)$). The lateral acceleration $ay_{return}$ is a value ($v\cdot\gamma$) obtained by multiplying the yaw rate (v·γ) at the current time point by the vehicle speed v at the current time point. Further, y ($t_{return}$) is the original lane return completion target lateral position, and is set to the center position of the original lane. In this case, when the camera sensor 12 is outputting the lane information of the original lane at the time point at which the yaw angle return control is completed, $y(t_{return})$ is zero ($y(t_{return})=0$). $y'(t_{return})$ represents the original lane return completion target lateral speed, and $y''(t_{return})$ represents the original lane return completion target lateral acceleration, both of which are set to zero.

Further, the return original lane target time $t_{return}$ is calculated using a target time setting constant $A_{return}$ according to Expression (22) below. The target time setting constant $A_{return}$ is set to a value approximately equal to the target time setting constant A used when the target lane changing time $t_{len}$ is calculated at the LCA start time point.

$$t_{return}=D_{return}\cdot A_{return} \quad (22)$$

In the Expression (22), $D_{return}$ is a required distance which is a distance for which the own vehicle is required to be moved in the lateral direction from the lateral position of the vehicle when the yaw angle return control is completed to the original lane return completion target lateral position (the center position of the original lane). The collision with the other vehicle has already been avoided by the time point at which the yaw angle return control is completed. Therefore, the speed at which the position of the own vehicle is laterally moved may be able to be the same speed as the speed in the LCA. Therefore, the target time setting constant $A_{return}$ is set to a value approximately equal to the target time setting constant A used when the LCA is performed.

Based on the set values of the original lane return target trajectory calculation parameters, the driving support ECU 10 calculates the values of the coefficients c0, c1, c2, c3, c4, and c5 of the function y(t) shown in the Expression (2), in the same manner as Step S14. Thereafter, the driving support ECU 10 finalizes/fixes the original lane return target trajectory function y (t) through substituting the values of the calculated coefficients c0, c1, c2, c3, c4 and c5 into the Expression (2).

The driving support ECU 10 finalizes/fixes the original lane return target trajectory function at Step S46 to advance the processing to Step S48. At Step S48, the driving support ECU 10 performs the steering control based on the original lane return target trajectory function calculated at the previous Step S46. In this case, the driving support ECU 10 resets the clock timer t (i.e., clears the clock timer t to 0, and thereafter, activates/starts the clock timer) to calculate the target lateral movement state amount (y*, vy*, ay*) and the target yaw state amount (θy*, γ*, Cu*), in the same manner as Step S15, based on the elapsed time t from the time point at which the the yaw angle return control is completed and the original lane return target trajectory function y (t), to thereby calculate the final target steering angle $\theta_{return}^*$. For example, the target steering angle $\theta_{return}^*$ can be calculated by replacing the left-hand side of the Expression (15) with the target steering angle $\theta_{return}^*$.

After the target control amount (the target steering angle $\theta_{return}^*$) is calculated, the driving support ECU 10 transmits the steering command representing the target control amount to the EPS ECU 20. In this embodiment, the driving support ECU 10 calculates the target steering angle $\theta_{return}^*$ as the target control amount, but the driving support ECU 10 may calculate a target torque for obtaining the target steering angle $\theta_{return}^*$, and transmit a steering command representing that target torque to the EPS ECU 20.

Subsequently, at Step S49, the driving support ECU 10 determines whether or not the termination condition of the LCA approach warning control state is established. In this case, when it is detected by the steering control in Step S48 that the lateral position of the own vehicle has reached the original lane return completion target lateral position (the center position of the original lane), the driving support ECU 10 determines that the termination condition of the LCA approach warning control state becomes established. Alternatively, when the driving support ECU 10 has detected that the LCA approach warning control state has continued for a predetermined time set in advance, the driving support ECU 10 may determine that the termination condition of the LCA approach warning control state becomes established.

When the driving support ECU 10 determines that the termination condition of the LCA approach warning control state has not been established (S49; No), the driving support ECU 10 returns the processing to Step S48. Therefore, the steering control at Step S48 continues being performed until the termination condition of the LCA approach warning control state becomes established. As a result, the own vehicle travels toward the center position of the original lane.

When the termination condition of the LCA approach warning control state is established while the processes described above are repeated, the driving support ECU 10 terminates the LCA approach warning control routine. In this case, the main routine (the steering assist control routine) is also terminated. The functional unit of the driving support ECU 10 which executes the processes of Step S46, Step S48 and Step S49 corresponds to the original lane return assist control unit of the present invention. The control process to have the own vehicle return to the original lane through the Steps S46, S48, and S49 is called an "original lane return control". The original lane return assist control corresponds to the original lane return assist control in the present invention. When the original lane return control is terminated, the driving support ECU 10 may advance the processing to Step S21 in the main routine to set the steering assist control state to the LTA ON state.

Figure 15:
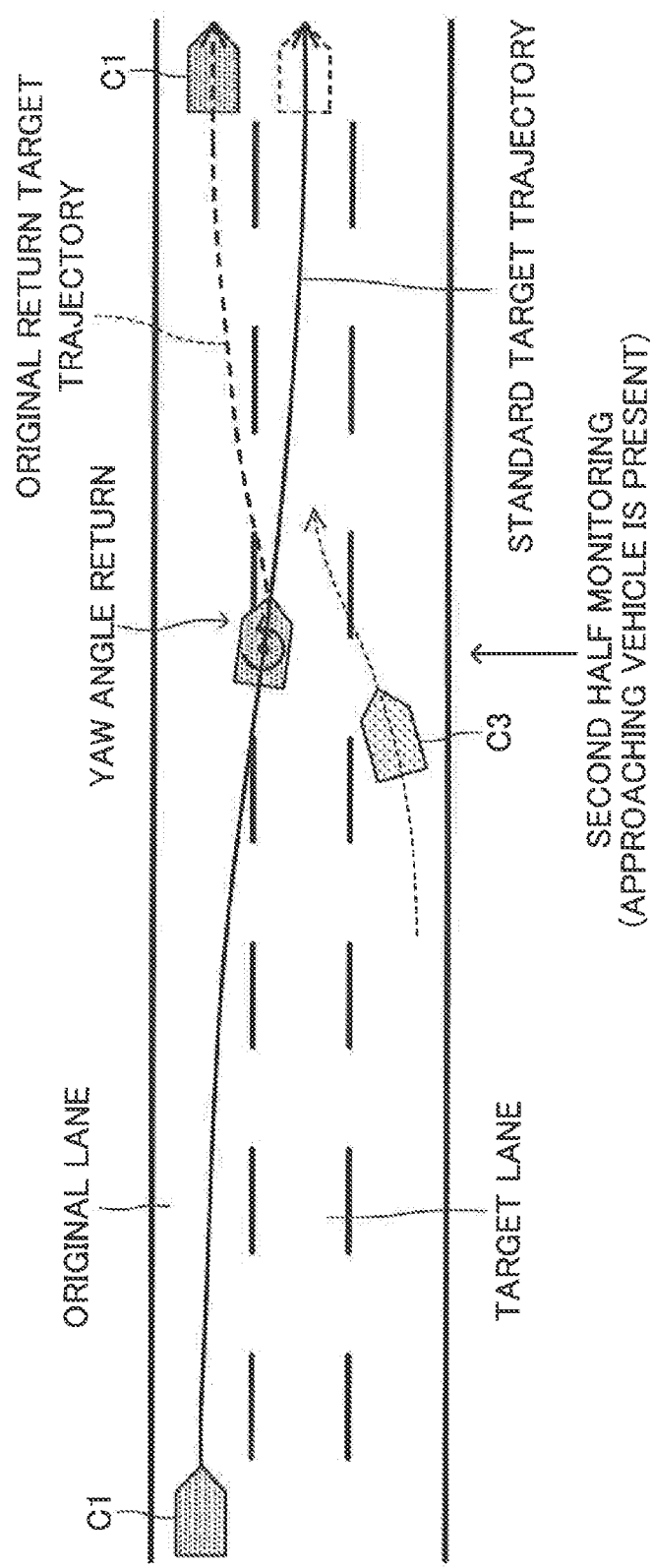
FIG. 15 is a diagram for illustrating a target trajectory and an original lane return target trajectory.

FIG. 15 shows the original lane return target trajectory when the own vehicle C1 and the other vehicle C3 approach each other in the LCA second half state.

Next, a case where the surrounding monitoring result of the original lane indicates that "the approaching vehicle is present" (S 45: No) will be described.

In this case, the driving support ECU 10 advances the processing to Step S47. At Step S47, the driving support ECU 10 calculates the target trajectory to maintain the lateral speed of the own vehicle at zero. This target trajectory is called a "lateral speed zero target trajectory". The target lateral position of the own vehicle to maintain the lateral speed at zero may be an actual lateral position at the current time point (the time when the yaw angle return control is completed), however, in this embodiment, is set to the lateral position of the own vehicle at the time point when the surrounding monitoring result has indicated that "the approaching vehicle is present". That is, the target lateral position of the own vehicle to maintain the lateral speed at zero is set to the lateral position of the own vehicle at the time point at which the steering assist control state is set to the LCA approach warning control state. This can exclude the influence of the overshoot due to the movement of the own vehicle in the lane change direction caused by the control response delay while the yaw angle return control has been performed. Therefore, the target lateral position of the own vehicle is set to a position obtained through returning/shifting the "lateral position at the time point when the yaw angle return control is completed" by the "amount of the overshoot" in the opposite lane change direction.

For this lateral speed zero target trajectory, the function y(t) shown in the Expression (2) is also used. The function representing the lateral speed zero target trajectory is called a "lateral speed zero target trajectory function y(t)". In order to determine the coefficients c0, c1, c2, c3, c4, and c5 of the function y(t) shown in the Expression (2) which finalize/fix the lateral speed zero target trajectory function y(t), the lateral speed zero target trajectory calculation parameters are set as follows. The lateral speed zero target trajectory calculation parameters are the following seven parameters (P31 to P37).

P31: a target lateral position (called a "zero keeping start target lateral position") of the own vehicle at the current time point (at the time point when the yaw angle return control is completed).

P32: a target lateral speed (called a "zero keeping start target lateral speed") of the own vehicle at the current time point (at the time when the yaw angle return control is completed).

P33: a target lateral acceleration (called a "zero keeping start target lateral acceleration") of the own vehicle at the current time point (at the time when the yaw angle return control is completed).

P34: a target lateral position (called a "zero keeping completion target position") which is a target value of a final lateral position for moving the own vehicle.

P35: a target lateral speed of the own vehicle (called a "zero keeping completion target lateral speed") when the own vehicle is moved to the zero keeping completion target position.

P36: a target lateral acceleration of the own vehicle (called a "zero keeping completion target lateral acceleration") when the own vehicle is moved to the zero keeping completion target position.

P37: a target time (called a "zero keeping target time") for moving the own vehicle from the zero keeping start target lateral position to the zero keeping completion target position.

Here, the lateral position (detected value) of the own vehicle at the time point when the steering assist control state is set to the LCA approaching warning control state is expressed as $y_{alert}$, the time (the current time) at which the yaw angle return control is completed is set to zero (t=0), the zero keeping target time is expressed as $t_{zero}$. Hereinafter, $y_{alert}$ is called an "approach detection lateral position".

Both the zero keeping start target lateral position and the zero keeping completion target position are set to the approach detection lateral position $y_{alert}$. Further, the zero keeping start target lateral speed, the zero keeping start target lateral acceleration, the zero keeping completion target lateral speed, and the zero keeping completion target lateral acceleration are all set to zero. Therefore, the lateral speed zero target trajectory calculation parameters are set as follows: y (0) alert, y' (0)=0, y" (0)=0, y ($t_{zero}$)=$y_{alert}$, y'($t_{zero}$)=0, and y"($t_{zero}$)=0.

The driving support ECU 10 calculates the values of the coefficients c0, c1, c2, c3, c4, and c5 of the function y(t) shown in the Expression (2), in the same manner as Step S14, based on set values of the lateral speed zero target trajectory calculation parameters. Then, the driving support ECU 10 finalizes/fixes the lateral speed zero target trajectory function y(t) through substituting the values of the calculated coefficients c0, c1, c2, c3, c4 and c5 into the Expression (2). In this case, the lateral speed zero target trajectory function y(t) is as follows: $y(t)=y_{alert}$ (constant value).

For example, the zero keeping target time $t_{zero}$ is set to five seconds. Therefore, the lateral speed zero target trajectory function y(t) becomes a function which maintains the target lateral position at $y_{alert}$ for 5 seconds.

At Step S47, the driving support ECU 10 finalizes the lateral speed zero target trajectory function y(t) to advance the processing to Step S48. At Step S48, the driving support ECU 10 performs the steering control based on the lateral speed zero target trajectory function calculated at the previous Step S47. In this case, the driving support ECU 10 resets clock timer t (clear the clock timer t to zero to start the clock timer), and calculates the target lateral movement state amount (y*,vy*,ay*) and the target yaw state amount (θy*, γ*, Cu*), in the same manner as Step S15, based on the elapsed time t after the yaw angle return control is completed and the lateral speed zero target trajectory function y(t) to calculate the final target steering angle $\theta_{zero}$*. The target steering angle $\theta_{zero}$* can be calculated, for example, through replacing the left-hand side of the Equation (15) with $\theta_{zero}$*.

When and after the driving support ECU 10 calculates the target control amount (the target steering angle $\theta_{zero}$*), the driving support ECU 10 transmits the steering command representing the target control amount to the EPS ECU 20. In this embodiment, the driving support ECU 10 calculates the target steering angle $\theta_{zero}$* as the target control amount, but the driving support ECU 10 may calculate a target torque for achieving/obtaining the target steering angle $\theta_{zero}$*, and transmit a steering command representing that target torque to the EPS ECU 20.

Subsequently, at Step S49, the driving support ECU 10 determines whether or not the termination condition of the LCA approach warning control state is established. In this case, the driving support ECU 10 determines whether or not a duration time of steering control performed at Step S48 reaches the zero keeping target time $t_{zero}$. Alternatively, the driving support ECU 10 may determine that the termination condition of the LCA approach warning control state becomes established, when it determines that the excessive approach state between the own vehicle and the other vehicle has disappeared, based on the surrounding information. As yet another example, the driving support ECU 10 may determine that the termination condition of the LCA approach warning control state becomes established, when the steering operation performed by the driver is detected (for example, when the steering torque detected by the steering torque sensor becomes larger than a steering operation determination threshold).

When the driving support ECU 10 determines that the termination condition of the LCA approach warning control state has not been established (S49: No), the driving support ECU 10 returns the processing to Step S48. Therefore, the steering control at Step S48 is performed until the termination condition of the LCA approach warning control state becomes established. As a result, the own vehicle travels along the lateral speed zero target trajectory. Therefore, the yaw angle of the own vehicle is maintained at zero, and the direction of the own vehicle (the longitudinal axis) is parallel to the formation direction of the lane. That is, it is possible to keep a state in which the own vehicle is traveling parallelly to the lane.

Accordingly, it is possible to ensure a time in which the steering wheel operation is handed over to the driver while assisting (the steering wheel operation) for avoiding the collision between the own vehicle and the other vehicle. The driver is aware of the necessity of performing a steering wheel operation owing to the approach alarm. Therefore, while the own vehicle is traveling parallelly to the lane, the driver can grasp the situation regarding other vehicles around the own vehicle to start the steering wheel operation.

Here, the reason for setting the target lateral position (which is constant) in the lateral speed zero target trajectory to the approach detection lateral position $y_{alert}$ is now described. When the approaching vehicle is detected in the LCA second half state, the yaw angle return control is performed. However, even if the yaw angle return control is performed, the own vehicle may travel/move in the lane change direction to some extent due to the response delay of the control. Therefore, when the lateral speed zero target trajectory is calculated, the lateral position of the own vehicle at the time point when the surrounding monitoring result at Step S19 indicates that "the approaching vehicle is present" is set as the target lateral position. That is, the lateral position of the own vehicle at the time point when the steering assist control state is set to the LCA approaching warning control state is set as the target lateral position for finalizing the lateral speed zero target trajectory.

Accordingly, when and after the steering control is started at Step S48, the own vehicle firstly returns to the approach detection lateral position $y_{alert}$, and thereafter, travels parallelly to the lane formation direction so as to maintain the lateral position at the approach detection lateral position $y_{alert}$. This can further improve safety.

When the termination condition of the LCA approach warning control state becomes established while the processes described above are repeated, the driving support ECU 10 terminates the LCA approach warning control routine. In this case, the main routine (the steering assist control routine) is also terminated. The functional unit of the driving support ECU 10 which performs the processes of Steps S47, S48, and S49 corresponds to the lateral speed zero control unit of the present invention. Hereinafter, the control process for maintain the lateral position of the own vehicle at zero through the Steps S47, S48, and S49 is called a "lateral speed zero control".

Figure 16:
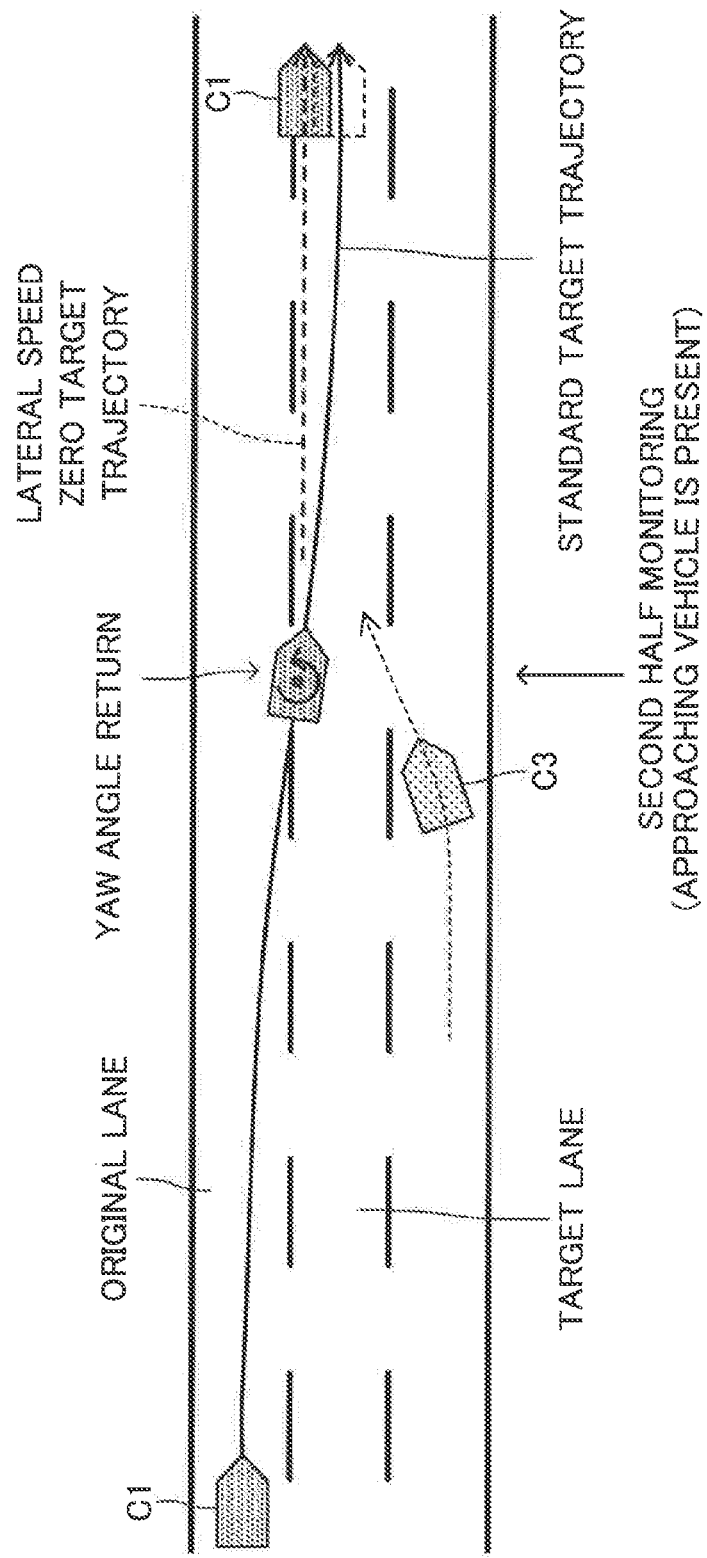
FIG. 16 is a diagram for illustrating the target trajectory and a lateral speed zero target trajectory.

FIG. 16 shows the lateral speed zero target trajectory when the own vehicle C1 and the other vehicle C3 approach each other in the LCA second half state.

According to the steering assist device according to the embodiment described above, the surrounding monitoring is continued even after the LCA is started while the surrounding monitoring is performed. Further, when the approaching vehicle is detected after the LCA is started, the LCA is terminated in the middle of the LCA (halfway), the mode of the steering assist control thereafter is selected/determined depending on the progress status of the lane change at that time. When the approaching vehicle is detected in the first half (state) of the lane change (LCA), the steering operation is assisted so as to return the own vehicle to the center position in the lane width direction of the original lane. As a result, the own vehicle is returned to an appropriate position while ensuring a state of the own vehicle. Consequently, convenience can be improved.

Further, when the approaching vehicle is detected in the second half (state) of the lane change (LAC), the approach warning/alert is given to the driver and the steering angle is controlled in such a manner that the yaw angle of the own vehicle is quickly returned to the yaw angle (in the state)

immediately before the LCA was started. Note that the yaw angle is controlled to be decreased to nearly zero owing to the LTA before the LCA is started. Moreover, in the yaw angle return control, the steering angle is controlled only through the feedforward control using the target steering angle $\theta_{emergency}*$ calculated based on the integral value of the target curvature Cu*.

The yaw angle return control needs to be completed in as short a time as possible. For example, when the steering angle is quickly changed using the detection value of the camera sensor 12 and when there is an error in the detection value of the camera sensor 12, the error in the detection causes the steering angle to rapidly change in the wrong direction. This may cause the the driver to feel a sense of discomfort. Further, when the feedback control for changing the steering angle is performed using the yaw angle θy detected by the camera sensor 12, a control delay is inevitable because a target control amount is set after detecting a change in a behavior of the vehicle. Therefore, in the present embodiment, the feedforward control based on the integral value of the target curvature Cu* is adopted to return the the yaw angle to the yaw angle (in the state) immediately before the start of the LCA so that yaw angle can be quickly decreased to zero. As a result, the lateral speed of the own vehicle can be reduced in a short time. Therefore, it is possible to quickly prevent the own vehicle from moving to the center side in the width direction of the target lane. As a result, it is possible to avoid/prevent the collision with the approaching vehicle through the steering assist control (so as to reduce the possibility of the collision). It should be noted that the feed forward control amount includes the component (Klca1·Cu) regarding the curvature Cu representing the curve shape of the road. However, this component is for having the own vehicle to travel along the shape of the road, and the change in the component is quite gentle/small (i.e., changes slowly) Thus, this component does not adversely affect the yaw angle return control.

Further, when the yaw angle control is completed and when there is a "space in the original lane" to which the own vehicle can safely return, the original lane return control is performed. That is, in this case, the original lane return target trajectory for returning the own vehicle to the center position of the original lane is calculated, and the steering angle is controlled in such a manner that the own vehicle moves along the original lane return target trajectory. Therefore, the own vehicle can be returned to a position which is more safe and more appropriate for the driver.

In contrast, when the own vehicle cannot be safely returned to the original lane, the lateral speed zero control is performed. As a result, the lateral position of the own vehicle is maintained at the approach detection lateral position. This can ensure the time in which the steering wheel operation is handed over to the driver while assisting (the steering wheel operation) for avoiding the collision between the own vehicle and the other vehicle. Therefore, the driver can move the own vehicle to an appropriate position by his/her own steering wheel operation from the situation where the own vehicle is traveling parallelly to the lane.

Further, the (final) target lateral position for the lateral speed zero trajectory is set to the lateral position (actual lateral position) of the own vehicle at the time point when the surrounding monitoring result indicates that "the approaching vehicle is present" in the LCA second state. Accordingly, even if the response delay in performing the yaw angle return control occurs, the own vehicle can be maintained at an appropriate lateral position.

Further, the lateral speed zero control is started when the yaw angle decreases to zero through the yaw angle return control. Therefore, switching from the yaw angle return control to the lateral speed zero control can be performed smoothly.

As described above, according to the present embodiment, safety can be improved even when the approaching vehicle is detected in the second half of the lane change (assist control).

Further, as for the first half state threshold TTC1 and the second half state threshold TTC2, each being the threshold of the collision time TTC used for determining the presence or absence of the approaching vehicle, the second half state threshold TTC2 is set to a value smaller than a value of the first half state threshold TTC1. For this reason, when the other vehicle which is likely to excessively approach the own vehicle is detected in the LCA first half state, the LCA can be terminated in good time well in advance while the safety is ensured. In contrast, in the LCA second half state, an emergency operation assist for avoiding the collision can be prevented from being performed more than necessary. Therefore, it is possible to prevent the LCA from being stopped in the middle of the LCA (halfway) more than necessary, and thus, it is possible to improve convenience.

Further, the target lateral speed of the own vehicle as well as the target lateral acceleration of the own vehicle are set to zero, when not only the LCA is terminated but also when each of the LCA cancellation control state and the original lane return control is completed. Accordingly, it is possible to have the own vehicle travel stably along the lane center line CL, thereafter.

Modified Example 1

In the present embodiment described above, the yaw angle return control is the control to return the yaw angle to the yaw angle in the state immediately before the LCA is started using the reversed sign integral value. However, the yaw angle return control does not necessarily have to use the reversed sign integral value. For example, at Step S42 of the routine shown in FIG. 7, the driving support ECU 10 may calculate the target steering angle to decrease (the absolute value of) the yaw angle using a maximum steering angle allowed to be used in the steering assist device. In this case, the driving support ECU 10, as in the above embodiment, may calculate/determine the target steering angle based on the maximum value $Cu'_{max}$ of the target curvature and the maximum change gradient $Cu'_{max}$ of the target curvature. At Step S43, the driving support ECU 10 transmits a steering command representing this target steering angle to the EPS·ECU 20.

Thereafter, at Step S44, the driving support ECU 10 may determine whether or not the yaw angle θy detected by the camera sensor 12 has become zero or whether or not the sign (positive or negative) of the yaw angle θy has been reversed. When the yaw angle θy detected by the camera sensor 12 has become zero or the sign of the yaw angle θy has been reversed, the driving support ECU 10 may determine that the yaw angle return has been completed (S44: Yes). This modified example 1 is preferably applied/adopted when the own vehicle has the camera sensor 12 with high-accuracy/precision.

Modified Example 2

In the LCA approach warning control routine (S40) of the present embodiment described above, when the steering assist control state is set to the LCA approach warning control state, the yaw angle return control is firstly performed, and thereafter, the assist control (the original lane return control or the lateral speed zero control) according to the surrounding monitoring result is secondly performed. In contrast, in this modified example 2, when the steering assist control state is set to the LCA approach warning control state, the driving support ECU 10 starts the original lane return control for returning the own vehicle to the center position of the original lane, and monitors the surrounding information on the original lane while performing the original lane return control. When the surrounding monitoring result on the original lane indicates that "the approaching vehicle is present", the lateral speed zero control is started to be performed in place of the original lane return control.

Figure 18:
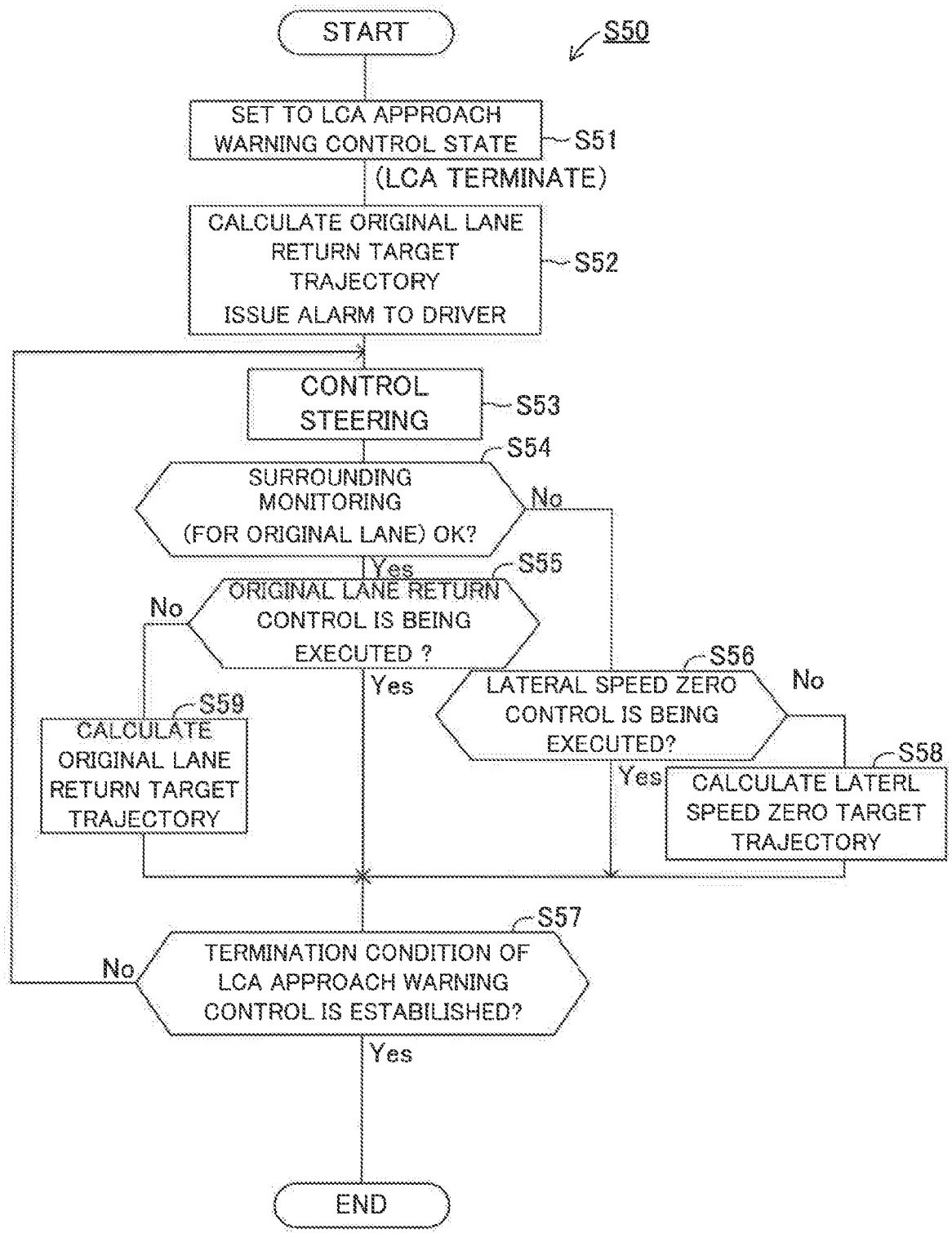
FIG. 18 is a flowchart for illustrating an LCA approach warning control routine according to a modified example

FIG. 18 shows an LCA approach warning control routine (S50) executed by the driving support ECU 10 according to the modified example, in place of the LCA approach warning control routine (S40) of the present embodiment described above. At Step S51, the driving support ECU 10 sets the steering assist control state to the LCA approach warning control state. When the steering assist control state is set to the LCA approach warning control state, the LCA is terminated.

Subsequently, at Step S52, the driving support ECU 10 finalizes the original lane return target trajectory through calculation and generates the warning/alert to the driver. The warning/alert to the driver is generated through the same process as the process of Step S42 of the embodiment described above. In calculating/finalizing the original lane return target trajectory, seven original lane return target trajectory parameters (P21 to P27) are set to be used, similarly to Step S46 of the embodiment described above. The parameters P21, P22 and P23 are respectively set to the lateral position (P21) of the own vehicle, the lateral speed (P22) of the own vehicle, and the lateral acceleration (P23) of the own vehicle, all of which being values obtained when the steering assist control state is set to the LCA approach warning control state. Further, the other parameters P 24 to P 27 are set in the same manner as the embodiment described above.

Here, the lateral position of the own vehicle at the current time point (the time point at which the steering assist control state is set to the LCA approach warning control state) is expressed as $y_{return}$, the lateral speed of the own vehicle at the current time point is expressed as $vy_{return}$, the lateral acceleration of the own vehicle at the current time point is r expressed as $ay_{return}$, the time point at which the steering assist control state is set to the LCA approach warning control state is se to 0 (t=0), and the original lane return target time is expressed as $t_{return}$. The original lane return target trajectory calculation parameters are set as follows: $y(0)=y_{return}$, $y'(0)=vy_{return}$, $y''(0)=ay_{return}$, $y(t_{return})=W$ (sign is set according to the lane change direction), $y'(t_{return})=0$, $y''(t_{return})=0$.

The lateral position $y_{return}$, the lateral speed $vy_{return}$, and the lateral acceleration $ay_{return}$ are calculated/determined in the same manner as the method for obtaining the initial lateral state amount described above based on values detected at the current time point. Further, $y(t_{return})$ is the original lane return completion target lateral position, and is set at the center position of the original lane. In this case, when the camera sensor 12 is outputting the lane information of the original lane at the time point when the steering assist control state is set to the LCA approach warning control state, $y(t_{return})$ is zero ($y(t_{return})=0$). $y'(t_{return})$ represents the original lane return completion target lateral speed, and $y''(t_{return})$ represents the original lane return completion target lateral acceleration, both of which are set to zero.

The original lane return target time of the parameter P27 needs to be set to a short time a short time for avoiding the emergency collision. Therefore, the original lane return target time $t_{return}$ is calculated according to the above Expression (22) using the target time setting constant $A_{return}$ set for avoiding the emergency collision. Thus, the target time setting constant $A_{return}$ is set to a value smaller than the target time setting constant $A_{cancel}$ used in the LCA cancellation control. Further, $D_{return}$ in the Expression (22) is a distance required to move in the lateral direction the own vehicle from the lateral position of the own vehicle at the time point when the steering assist control state is set to the LCA approach warning control state to the original lane return completion target lateral position (the center position of the original lane).

The driving support ECU 10 finalizes/fixes the original lane return target trajectory function y(t), in the same manner as Step S14, based on the set values of the original lane return target trajectory calculation parameters. At Step S52, the driving support ECU 10 calculates the original lane return target trajectory function to advance the processing to Step S53.

At Step S53, the driving support ECU 10 performs the steering control based on the target trajectory function which is fixed at the current time point. The steering control is performed in the same manner as Step S48 of the embodiment described above. In this case, the original lane return control is started.

Subsequently, at Step S54, the driving support ECU 10 determines whether or not there is the space for safely returning the own vehicle to the original lane (i.e., the "space in the original lane" to which the own vehicle can be safely returned), based on the surrounding information obtained by the surrounding sensors 11. This determination process is executed in the same manner as Step S45 of the embodiment described above.

When the surrounding monitoring result on the original lane indicates that "the approaching vehicle is not present", the driving support ECU 10 advances the processing to Step S55. In contrast, when the surrounding monitoring result on the original lane indicates that "the approaching vehicle is present", the driving support ECU 10 advances the processing to Step S56.

When the surrounding monitoring result on the original lane indicates that "the approaching vehicle is not present", the driving support ECU 10 determines whether or not the original lane return control is being performed at Step S55. In this case, when the determination at Step S55 is made for the first time, a "Yes" determination is made, so that the driving support ECU 10 advances the processing to Step S57. At Step S57, the driving support ECU 10 determines whether or not the termination condition of the LCA approach warning control state is established. The determination processing in Step S57 is the same as the determination processing in Step S49 of the embodiment described above.

When the driving support ECU 10 determines that the termination condition of the LCA approach warning control state is not established (S57: No), the driving support ECU 10 returns the processing to Step S53. Therefore, in this case, the original lane return control is continued.

When the surrounding monitoring result of the original lane indicates that "the approaching vehicle is present" while the original lane return control is being performed at Step S54, the driving support ECU 10 advances the processing to Step S56. At Step S56, the driving support ECU 10 determines whether or not the lateral speed zero control is being performed. In this case, since the original lane return control is being performed, the driving support ECU 10 makes a "No" determination at Step S56 to advance the processing to the Step S58 to calculate/finalize the lateral speed zero target trajectory. The driving support ECU 10 can calculate/finalize the lateral speed zero target trajectory for maintaining the lateral speed at zero through setting the target lateral position to the lateral position at the current time point. The calculation method of the lateral speed zero target trajectory is the same as the method used at Step S47 of the embodiment described above. The zero keeping target time is also determined in the same manner as Step S47 of the embodiment described above. When and after the driving support ECU 10 calculates/finalizes the lateral speed zero target trajectory, the driving support ECU 10 advances the processing to Step S57.

In this case, the steering control performed at Step S53 is switched from the original lane return control to the lateral speed zero control. When and after the lateral speed zero control is started, a "Yes" determination is made at Step S56. Thus, the processing of Step S58 is skipped. As a result, the lateral speed zero control continues to be performed.

When the surrounding monitoring result on the original lane indicates that "the approaching vehicle is not present" at Step S54 while the lateral speed zero control is being performed, the driving support ECU 10 advances the processing to Step S55. In this case, since the original lane return control is not being performed, the driving support ECU 10 calculates/finalizes the original lane return target trajectory at Step S59. The original lane return target trajectory is a target trajectory for moving the own vehicle from the current (lateral) position to the original lane return completion target lateral position (which is the center position of the original lane). At Step S59, the original lane return target trajectory can be calculated in the same calculation manner as Step S52. It should be noted that the target time setting constant $A_{return}$ may be set to a value larger than the value used at Step S52 (for example, the constant $A_{return}$ may be set to a value approximately equal to the target time setting constant $A_{return}$ used at Step S46 of the embodiment described above), so that the original lane return is performed (the own vehicle is moved to the original lane) slowly.

When the termination condition of the LCA approach warning control state is established (S57: Yes), the driving support ECU 10 terminates the LCA approach warning control routine.

It should be noted that, in this modified example 2, in order that the lane return control and the lateral speed zero control may not be alternately switched (in order to prevent hunting between the lane return control and the lateral speed zero control), the original lane return control may be prohibited from being restarted once and after the lateral speed zero control is started. In this case, when a "No" determination is made at Step 55 is, the driving support ECU 10 may advance the processing to Step S56.

Modified Example 3

In the present embodiment described above, when the steering assist control state is set to the LCA approach warning control state, the warning/alarm (S42) to the driver and the steering assist (S42, S43) for avoiding the collision are simultaneously started. Instead, the warning/alarm to the driver may be firstly performed to urge the driver to operate the steering wheel, and thereafter, the LCA may be terminated to start the LCA approach warning control when the degree of approach between the own vehicle and the other vehicle is further increased (i.e., when the own vehicle and the other vehicle comes much closer to each other).

Figure 19:
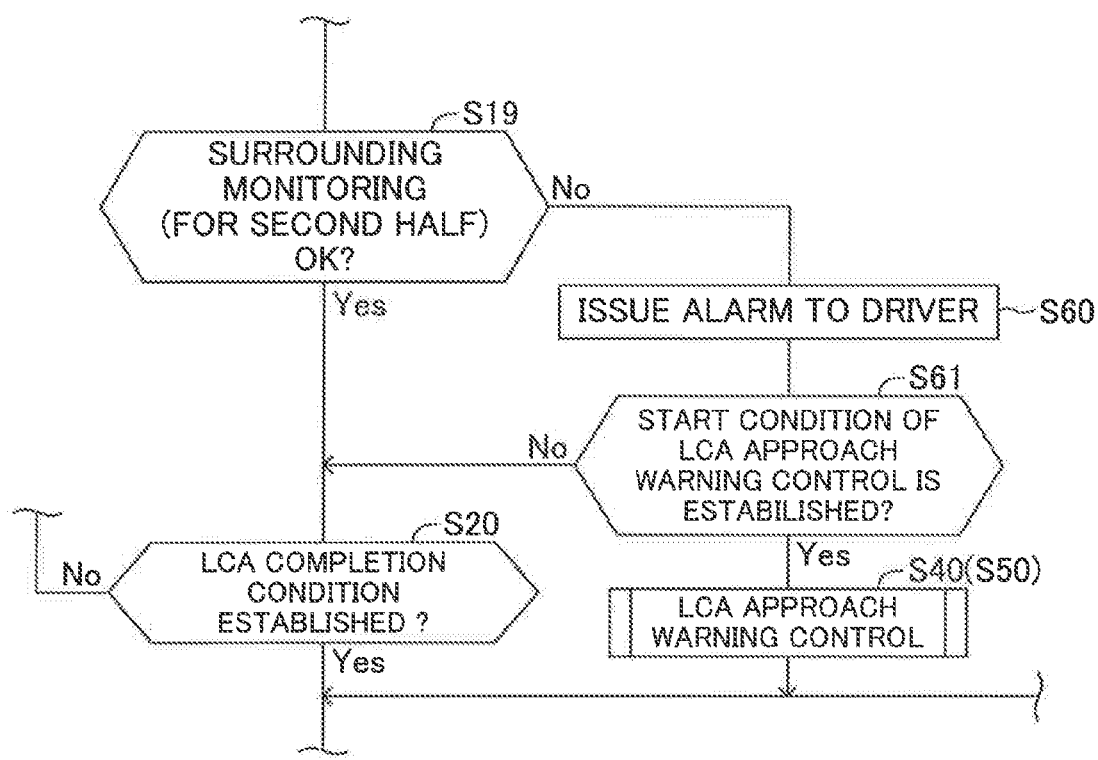
FIG. 19 is a flowchart for illustrating a steering assist control routine according to a modified example

FIG. 19 shows a modified example (modified portion) of the steering assist control routine. When the driving support ECU 10 has determined that "the approaching vehicle is present" at Step S19 (S19: No), the driving support ECU 10 generates/gives the alarm to the driver at Step S60. Subsequently, at Step S61, the driving support ECU 10 determines whether or not the condition for starting the LCA approach warning control becomes established. In this case, the driving support ECU 10 determines whether or not the collision time TTC becomes shorter than the threshold TTCsteer. For example, the threshold TTCsteer is set to a value shorter than the second half state threshold TTC2 used at Step S19. When the collision time TTC is equal to or longer than the threshold TTCsteer, the driving support ECU 10 advances the processing to Step S20. On the other hand, when the collision time TTC is shorter than the threshold TTCsteer, the driving support ECU 10 advances the processing to Step S40 (or Step S50). This modified example 3 can further improve the convenience of the device.

The steering assist device according to the embodiment and the modified examples have been described, but the present invention is not limited to them, and various changes are possible within the range not departing from the object of the present invention.

For example, in the above embodiment, the final target lateral position in the LCA approach warning control state is set to the center position of the original lane. However, the final target lateral position in the LCA approach warning control state is not necessarily set to the center position of the original lane, but may be set to any lateral position within the original lane.

Further, in the above embodiment, the condition that the steering assist control state is the LTA ON state (the state where the LTA is being performed) is required to start performing the LCA. However, that condition is not necessarily required to perform the LCA. Furthermore, the ACC is not necessarily required to perform the LCA. Further, in the present embodiment, the LCA is allowed to be performed on the condition that the road on which the own vehicle is traveling is a road exclusively for automobiles. However, rhe LCA may be allowed to be performed without that condition.

Further, in the above embodiment, the camera sensor 12 is configured to recognize the lane. However, for example, the navigation ECU 70 may detect the relative positional relationship of the own vehicle with respect to the lane.

What is claimed is:
1. A steering assist device comprising:
    surrounding monitoring means for monitoring surroundings of an own vehicle;
    lane recognition means for recognizing a lane to obtain lane information including a relative positional relationship of said own vehicle with respect to said lane;
    lane change assist control means for starting a lane change assist control to control, in response to a lane change assist request, a steering so as to have said own vehicle change lanes from an original lane in which said own vehicle is currently traveling toward a target lane adjacent to said original lane, based on said lane information, when an other vehicle which has a prob- ability to be an obstacle when said own vehicle is changing lanes is not detected by said surrounding monitoring means;

lane change assist stop means for stopping said lane change assist control, when said surrounding monitoring means detects an approaching vehicle which has a probability of excessively approaching said own vehicle if said lane change assist control continues being performed, while said lane change assist control is being performed;

notification means for notifying a driver of said own vehicle that said lane change assist control is stopped halfway;

original lane return assist control means for performing original lane return assist control to control said steering so as to have said own vehicle return to said original lane from said target lane, when said approaching vehicle is detected while said own vehicle is travelling in said target lane after entering said target lane so that said lane change assist control is stopped;

approaching vehicle-in-original-lane determination means for determining, based on monitoring information detected by said surrounding monitoring means, whether or not an original lane side vehicle is detected, said original lane side vehicle being an other vehicle having a probability of excessively approaching said own vehicle if said own vehicle is returned to said original lane; and lateral speed zero control means for prohibiting said original lane return assist control means from performing said original lane return assist control, and for performing lateral speed zero control to control said steering so as to maintain a lateral speed which is a speed in a lane width direction of said own vehicle at zero, when said approaching vehicle-in-original-lane determination means determines that said original lane side vehicle is detected.

2. The steering assist device according to claim 1, further comprising collision avoidance assist control means for performing collision avoidance assist control to control said steering so as to decrease a yaw angle formed between a formation direction of a lane and a direction in which said own vehicle faces at an emergency speed higher than a speed at which said yaw angle changes through said original lane return assist control, when said approaching vehicle is detected while said own vehicle is travelling in said target lane after entering said target lane so that said lane change assist control is stopped, wherein,
said original lane return assist control means is configured to perform said original lane return assist control after said collision avoidance assist control is performed; and
said lateral speed zero control means is configured to perform said lateral speed zero control after said collision avoidance assist control is performed.

3. The steering assist device according to claim 2, wherein,
said lateral speed zero control means is configured to set a target position of said own vehicle in said lane width direction when performing said lateral speed zero control to a position of said own vehicle in said lane width direction at a time point at which said approaching vehicle is detected.

4. The steering assist device according to claim 1, further comprising center return assist control means for performing center return assist control to control said steering so as to have said own vehicle return to a center position in the lane width direction of said original lane, when said approaching vehicle is detected while said own vehicle is travelling in said original lane so that said lane change assist control is stopped.

* * * * *